US012421874B2

(12) United States Patent
Tanaka et al.

(10) Patent No.: US 12,421,874 B2
(45) Date of Patent: Sep. 23, 2025

(54) ORGANIC RANKINE CYCLE WITH INTEGRATED FIRE EXTINGUISHING FUNCTION

(71) Applicant: MITSUBISHI HEAVY INDUSTRIES, LTD., Tokyo (JP)

(72) Inventors: Toshimitsu Tanaka, Tokyo (JP); Ryo Takata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 349 days.

(21) Appl. No.: 18/103,001

(22) Filed: Jan. 30, 2023

(65) Prior Publication Data

US 2023/0271043 A1 Aug. 31, 2023

(30) Foreign Application Priority Data

Feb. 28, 2022 (JP) ................................ 2022-028781

(51) Int. Cl.
*F01K 25/10* (2006.01)
*A62C 3/16* (2006.01)
(Continued)

(52) U.S. Cl.
CPC .............. *F01K 25/10* (2013.01); *A62C 35/60* (2013.01); *A62C 35/64* (2013.01); *F01K 9/003* (2013.01); *F01K 25/08* (2013.01); *A62C 3/16* (2013.01)

(58) Field of Classification Search
CPC ........... F01K 9/003; F01K 25/08; F01K 25/10
See application file for complete search history.

(56) References Cited

U.S. PATENT DOCUMENTS 5,515,691 A * 5/1996 Wertenbach ......... B60H 1/3225 62/133
10,759,259 B2 * 9/2020 Baumgärtner ....... B60H 1/3222
(Continued)

FOREIGN PATENT DOCUMENTS

EP 1040947 A2 * 10/2000 ............... A62C 3/07
JP 2007-520662 A 7/2007
(Continued)

OTHER PUBLICATIONS

Japanese Office Action for Japanese Application No. 2022-028781, dated May 20, 2025, with English translation.

*Primary Examiner* — Laert Dounis
(74) *Attorney, Agent, or Firm* — Birch, Stewart, Kolasch & Birch, LLP

(57) ABSTRACT

An ORC configured to circulate a fire extinguishing agent and at least one fire extinguishing agent supply line. The ORC cycle includes a condenser provided on the ORC cycle and configured to liquefy a gaseous fire extinguishing agent that is the fire extinguishing agent in a gas state, a booster pump provided on a downstream side of the condenser on the ORC cycle and configured to pressurize a liquid fire extinguishing agent obtained by liquefying the gaseous fire extinguishing agent in the condenser, a vaporizer provided on a downstream side of the booster pump on the ORC cycle and configured to vaporize the liquid fire extinguishing agent, and an expansion turbine provided on a downstream side of the vaporizer and on an upstream side of the condenser on the ORC cycle and configured to be driven by a gaseous fire extinguishing agent obtained by vaporizing the liquid fire extinguishing agent.

18 Claims, 11 Drawing Sheets

1

(51) Int. Cl.

| | |
|---|---|
| ***A62C 35/60*** | (2006.01) |
| ***A62C 35/64*** | (2006.01) |
| ***F01K 9/00*** | (2006.01) |
| ***F01K 25/08*** | (2006.01) |

(56) References Cited

U.S. PATENT DOCUMENTS

| | | | | |
|---|---|---|---|---|
| 2005/0166607 | A1 | 8/2005 | Brasz et al. | |
| 2009/0007578 | A1* | 1/2009 | Yabu | F24F 1/0068 62/190 |
| 2011/0308252 | A1* | 12/2011 | Kopecek | F01K 25/10 60/660 |
| 2018/0371955 | A1* | 12/2018 | Kido | F01P 3/20 |
| 2020/0200049 | A1* | 6/2020 | Ryu | F02B 37/12 |
| 2023/0181956 | A1* | 6/2023 | Lee | A62C 37/40 169/47 |

FOREIGN PATENT DOCUMENTS

| | | | | | |
|---|---|---|---|---|---|
| JP | 2010-267707 | A | | 11/2010 | |
| KR | 20160073355 | A | * | 6/2016 | |
| WO | WO-2021157029 | A1 | * | 8/2021 | |
| WO | WO-2023073660 | A1 | * | 5/2023 | F01K 25/10 |

* cited by examiner

ORGANIC RANKINE CYCLE WITH INTEGRATED FIRE EXTINGUISHING FUNCTION

CROSS-REFERENCE TO RELATED APPLICATIONS

This application claims the benefit of priority to Japanese Patent Application Number 2022-028781 filed on Feb. 28, 2022. The entire contents of the above-identified application are hereby incorporated by reference.

TECHNICAL FIELD

The disclosure relates to fire extinguishing equipment.

RELATED ART

Known nitrogen gas fire extinguishing equipment, which includes a plurality of gas cylinders storing nitrogen gas, discharges, in case of fire, the nitrogen gas supplied from the gas cylinders to extinguish the fire by oxygen deficiency. This nitrogen gas fire extinguishing equipment requires an occupied space to store the plurality of gas cylinders.

SUMMARY

In recent years, fire extinguishing agents that can be stored in a liquid state and can extinguish a fire by cooling have been put on the market. However, the fire extinguishing agents have higher introduction cost than nitrogen gas and have not become widespread. That is, fire extinguishing equipment has a problem of its economic efficiency.

WO 2021/157029 discloses circulating a mixed refrigerant containing a fire extinguishing refrigerant and a flammable refrigerant on a refrigeration cycle and spraying a refrigerant excluding a flammable refrigerant in case of fire. The refrigeration cycle circulating the mixed refrigerant described in WO 2021/157029 has a configuration significantly different from an organic Rankine cycle (ORC cycle) circulating a single medium. In addition, the technology described in WO 2021/157029 does not contribute to the improvement of the economic efficiency that is the problem to be solved by the disclosure.

In view of the foregoing circumstances, at least one embodiment of the disclosure is intended to provide fire extinguishing equipment that can improve the economic efficiency.

Fire extinguishing equipment according to at least one embodiment of the disclosure includes an ORC cycle configured to circulate a fire extinguishing agent as a working medium and at least one fire extinguishing agent supply line. The ORC cycle includes a condenser provided on the ORC cycle and configured to transfer cold energy from a first heat medium to a gaseous fire extinguishing agent that is the fire extinguishing agent in a gas state to liquefy the gaseous fire extinguishing agent, a booster pump provided on a downstream side of the condenser on the ORC cycle and configured to pressurize a liquid fire extinguishing agent obtained by liquefying the gaseous fire extinguishing agent in the condenser, a vaporizer provided on a downstream side of the booster pump on the ORC cycle and configured to transfer heat energy from a second heat medium to the liquid fire extinguishing agent to vaporize the liquid fire extinguishing agent, and an expansion turbine provided on a downstream side of the vaporizer and on an upstream side of the condenser on the ORC cycle and configured to be driven by a gaseous fire extinguishing agent obtained by vaporizing the liquid fire extinguishing agent. The at least one fire extinguishing agent supply line is configured to extract at least one of the liquid fire extinguishing agent or the gaseous fire extinguishing agent from the ORC cycle and supply at least one of the liquid fire extinguishing agent or the gaseous fire extinguishing agent to at least one fire prevention area.

At least one embodiment of the disclosure provides fire extinguishing equipment that can improve the economic efficiency.

BRIEF DESCRIPTION OF DRAWINGS

The disclosure will be described with reference to the accompanying drawings, wherein like numbers reference like elements.

DESCRIPTION OF EMBODIMENTS

Figure 1:
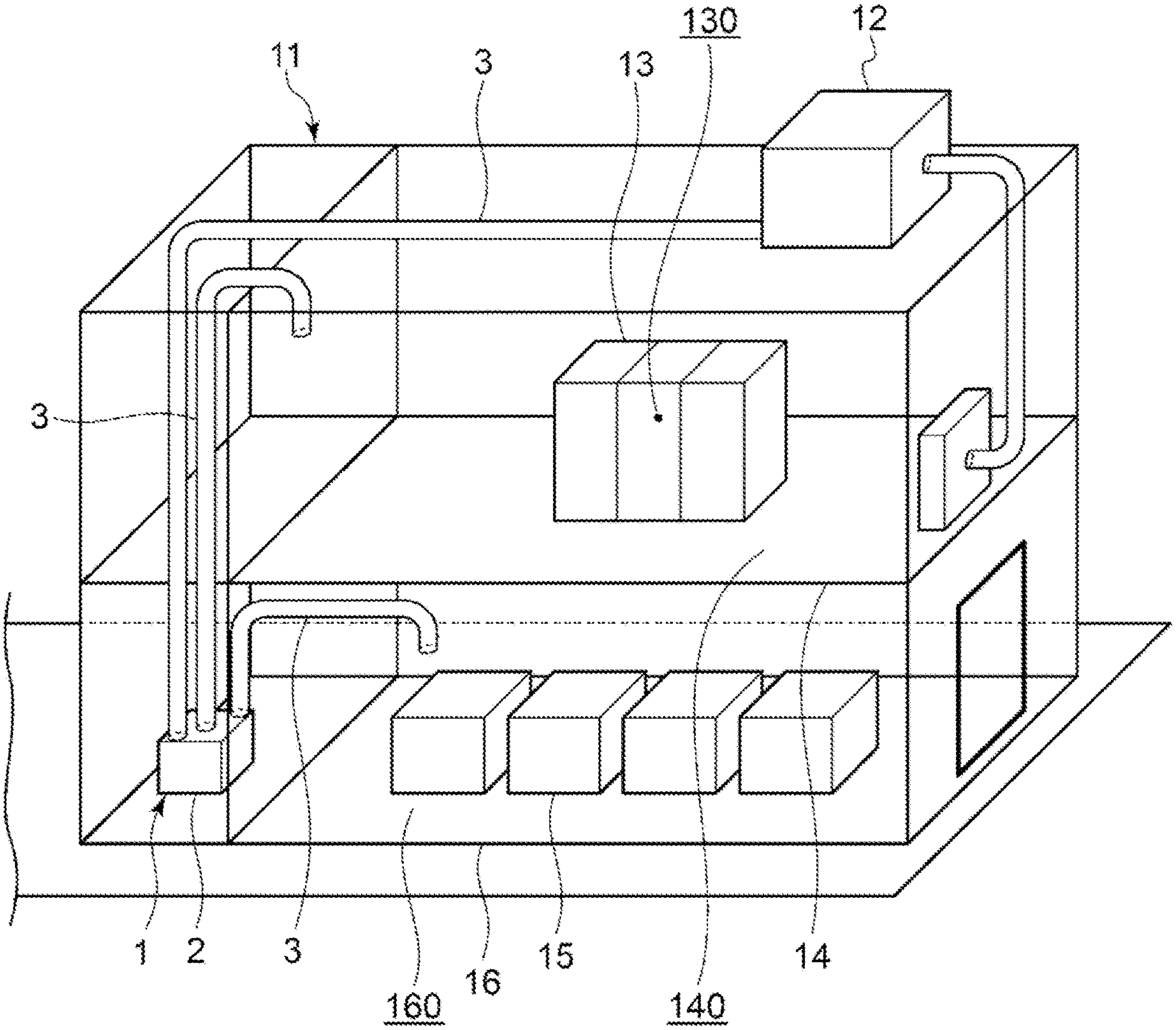
FIG. 1 is a schematic diagram of a structure including fire extinguishing equipment according to one embodiment.
Figure 2:
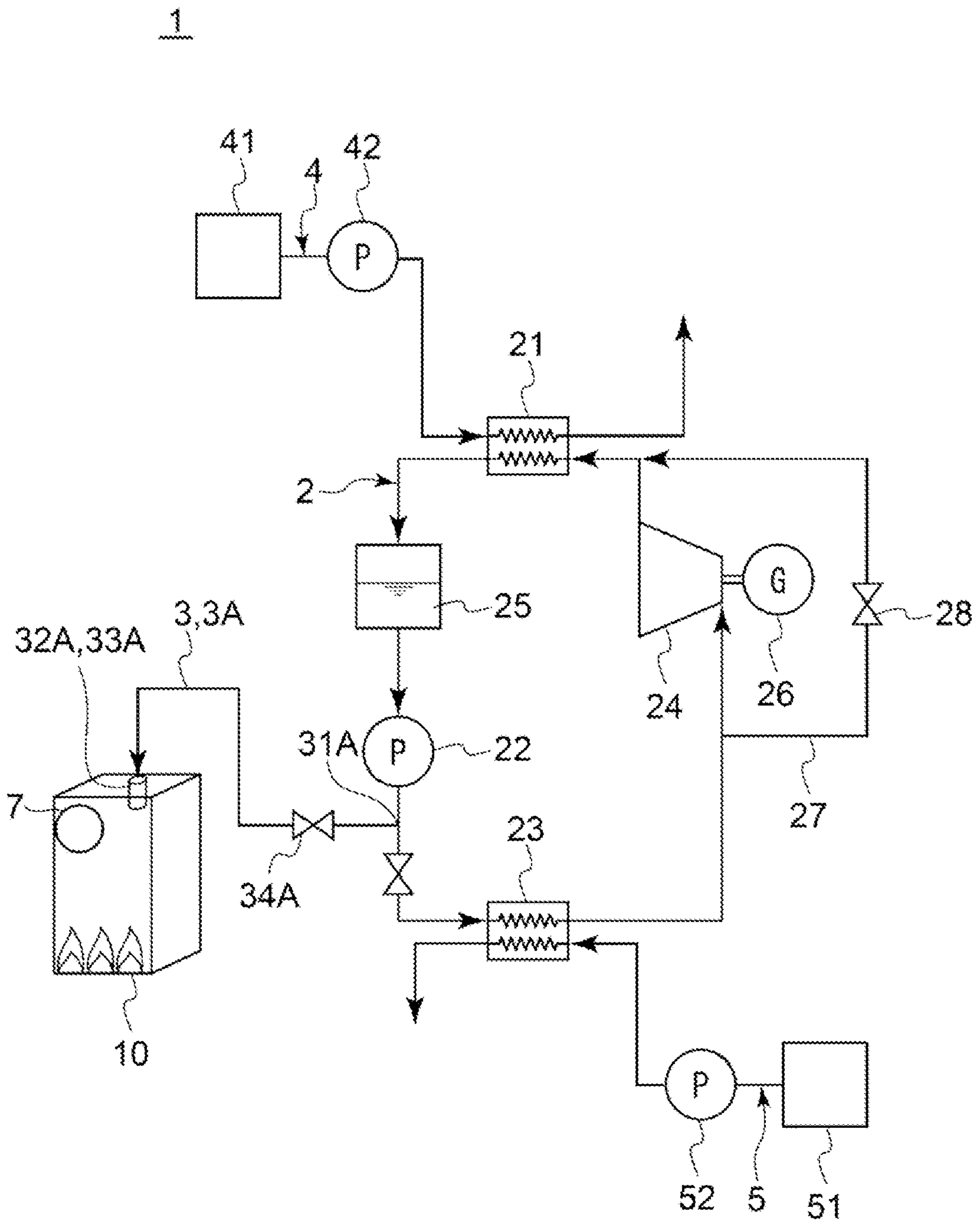
FIG. 2 is a schematic diagram of fire extinguishing equipment according to one embodiment.

Some embodiments of the disclosure will be described below with reference to the accompanying drawings. However, dimensions, materials, shapes, relative arrangements or the like of components described in the embodiments or illustrated in the drawings are not intended to limit the scope of the disclosure to them but are merely explanatory examples.

Structure Including Fire Extinguishing Equipment

FIG. 1 is a schematic diagram of a structure including fire extinguishing equipment according to one embodiment. Each of FIGS. 2 to 11 is a schematic diagram of fire extinguishing equipment according to one embodiment. Fire extinguishing equipment 1 according to some embodiments is installed in a structure 11. In the illustrated embodiment, the structure 11 consists of a data center. The structure 11 includes an air conditioner 12 for conditioning the air in the structure 11, a server rack 13 including an interior space 130 for housing a server, a server room 14 including an interior space 140 for housing the server rack 13, a UPS for the server, and the like, and a power equipment room 16 including an interior space 160 for housing power supply equipment 15 such as a generator and substation equipment. Since a fire due to electric equipment may occur, at least one of the air conditioner 12, the server rack 13, the server room 14, or the power equipment room 16 may be a fire prevention area 10 described later. That is, the structure 11 includes at least one fire prevention area 10.

Fire Extinguishing Equipment

As illustrated in FIGS. 1 to 11, the fire extinguishing equipment 1 according to some embodiments includes an ORC cycle 2 configured to circulate a fire extinguishing agent as a working medium and at least one fire extinguishing agent supply line 3 configured to extract the fire extinguishing agent from the ORC cycle 2 and supply the fire extinguishing agent to the at least one fire prevention area 10. Hereinafter, a fire extinguishing agent in a substantially liquid state is referred to as a liquid fire extinguishing agent, and a fire extinguishing agent in a substantially gaseous state is referred to as a gaseous fire extinguishing agent.

Fire Extinguishing Agent

A fire extinguishing agent is preferably a halide such as HFC227ea or Novec (trade name) 1230, for example. The fire extinguishing agent preferably has high flame retardance having electrical conductivity equal to or lower than a predetermined value when measured at a predetermined temperature.

ORC Cycle

The ORC cycle 2 consists of a circulation system configured to circulate the fire extinguishing agent as a working medium. As illustrated in FIGS. 2 to 11, the ORC cycle 2 includes a condenser 21, a booster pump 22, a vaporizer 23, and an expansion turbine 24 provided on the ORC cycle 2. The ORC cycle 2 constitutes an organic Rankine cycle using the fire extinguishing agent as a working medium. In the following description, when simply referred to as an upstream side, an upstream side means an upstream side along a main flow direction of a fluid in a section or a region related to the description of a direction. Similarly, in the following description, when simply referred to as a downstream side, a downstream side means a downstream side along a main flow direction of a fluid in a section or a region related to the description of a direction.

Condenser

The condenser 21 is provided on a downstream side of the expansion turbine 24 and on an upstream side of the booster pump 22 on the ORC cycle 2. A fire extinguishing agent expanded in the expansion turbine 24 flows into the condenser 21 in a gaseous state. The condenser 21 is configured to transfer cold energy from a first heat medium (e.g., cooling water) flowing through a first heat medium supply line 4 to a gaseous fire extinguishing agent flowing through the ORC cycle 2 to liquefy the gaseous fire extinguishing agent.

In the illustrated embodiment, the condenser 21 includes a first fire extinguishing agent-side flow path provided on the ORC cycle 2 and a first heat medium-side flow path provided on the first heat medium supply line 4. The gaseous fire extinguishing agent flows through the first fire extinguishing agent-side flow path, and the first heat medium flows through the first heat medium-side flow path. The first heat medium has a temperature lower than that of the gaseous fire extinguishing agent. The condenser 21 is configured to allow heat exchange between the first fire extinguishing agent-side flow path and the first heat medium-side flow path. The heat exchange in the condenser 21 causes the gaseous fire extinguishing agent flowing through the first fire-extinguishing agent-side flow path to be cooled and condensed (liquefied) by the first heat medium flowing through the first heat medium-side flow path.

First Heat Medium Tank and First Heat Medium Supply Line

As illustrated in FIGS. 2 to 11, the fire extinguishing equipment 1 may further include a first heat medium tank 41 configured to store the first heat medium in a liquid state and the first heat medium supply line 4. The first heat medium supply line 4 consists of a first heat medium supply system configured to feed the first heat medium from the first heat medium tank 41 to a supply destination of the first heat medium (e.g., the condenser 21). The first heat medium in a liquid state stored in the first heat medium tank 41 has a lower temperature than that of the gaseous fire extinguishing agent to be guided to the condenser 21. In an embodiment, the first heat medium tank 41 stores cooling water at approximately 5° C. as the first heat medium. The first heat medium from the first heat medium tank 41 flows into the condenser 21 in a liquid state.

One end (upstream end) of the first heat medium supply line 4 is connected to the first heat medium tank 41, and the other end (downstream end) of the first heat medium supply line 4 is connected to a supply destination of the first heat medium (e.g., the condenser 21). The first heat medium supply line 4 includes a first heat medium pump 42 provided on an upstream side of the condenser 21 on the first heat medium supply line 4 and configured to feed the first heat medium in a liquid state. The first heat medium in a liquid state stored in the first heat medium tank 41 is extracted to the first heat medium supply line 4 by the first heat medium pump 42, and the first heat medium is fed to a downstream side of the first heat medium supply line 4.

Booster Pump

The booster pump 22 is provided on a downstream side of the condenser 21 on the ORC cycle 2. The fire extinguishing agent liquefied in the condenser 21 flows into the booster pump 22 in a liquid state. The booster pump 22 is configured to pressurize a liquid fire extinguishing agent. Driving the booster pump 22 causes the fire extinguishing agent to be circulated on the ORC cycle 2 as a working medium.

Fire Extinguishing Agent Storage Tank

As illustrated in FIGS. 2 to 11, the ORC cycle 2 may further include a fire extinguishing agent storage tank 25 provided on a downstream side of the condenser 21 and on an upstream side of the booster pump 22 on the ORC cycle 2. The fire extinguishing agent storage tank 25 is configured to store a liquid fire extinguishing agent obtained by liquefying the gaseous fire extinguishing agent in the condenser 21. Driving the booster pump 22 causes the liquid fire extinguishing agent stored in the fire extinguishing agent storage tank 25 to be fed to a downstream side of the fire extinguishing agent storage tank 25 on the ORC cycle 2.

Vaporizer

The vaporizer 23 is provided on a downstream side of the booster pump 22 and on an upstream side of the expansion turbine 24 on the ORC cycle 2. The fire extinguishing agent pressurized by the booster pump 22 flows into the vaporizer 23 in a liquid state. The vaporizer 23 is configured to transfer heat energy from a second heat medium (e.g., refrigerant oil or refrigerant water that has recovered server waste heat) flowing through a second heat medium supply line 5 to the liquid fire extinguishing agent flowing through the ORC cycle 2 to vaporize the liquid fire extinguishing agent.

In the illustrated embodiment, the vaporizer 23 includes a second fire extinguishing agent-side flow path provided on the ORC cycle 2 and a second heat medium-side flow path provided on the second heat medium supply line 5. The liquid fire extinguishing agent flows through the second fire extinguishing agent-side flow path, and the second heat medium flows through the second heat medium-side flow path. The second heat medium has a temperature higher than that of the liquid fire extinguishing agent. The vaporizer 23 is configured to allow heat exchange between the second fire extinguishing agent-side flow path and the second heat medium-side flow path. The heat exchange in the vaporizer 23 causes the liquid fire extinguishing agent flowing through the second fire-extinguishing agent-side flow path to be heated and evaporated (vaporized) by the second heat medium flowing through the second heat medium-side flow path.

Second Heat Medium Tank and Second Heat Medium Supply Line

As illustrated in FIGS. 2 to 11, the fire extinguishing equipment 1 may further include a second heat medium tank 51 configured to store the second heat medium in a liquid state and the second heat medium supply line 5. The second heat medium supply line 5 consists of a second heat medium supply system configured to feed the second heat medium from the second heat medium tank 51 to a supply destination of the second heat medium (e.g., the vaporizer 23). The second heat medium in a liquid state stored in the second heat medium tank 51 has a higher temperature than that of the liquid fire extinguishing agent to be guided to the vaporizer 23. In an embodiment, the second heat medium tank 51 stores waste heat recovery refrigerant (e.g., refrigerant oil or refrigerant water) at approximately 60° C. that has recovered server waste heat as the second heat medium. The second heat medium from the second heat medium tank 51 flows into the vaporizer 23 in a liquid state.

One end (upstream end) of the second heat medium supply line 5 is connected to the second heat medium tank 51, and the other end (downstream end) of the second heat medium supply line 5 is connected to a supply destination of the second heat medium (e.g., the vaporizer 23). The second heat medium supply line 5 includes a second heat medium pump 52 that is provided on an upstream side of the vaporizer 23 on the second heat medium supply line 5 and configured to feed the second heat medium in a liquid state. The second heat medium in a liquid state stored in the second heat medium tank 51 is extracted to the second heat medium supply line 5 by the second heat medium pump 52, and the second heat medium is fed to a downstream side of the second heat medium supply line 5.

The expansion turbine 24 is provided on a downstream side of the vaporizer 23 and on an upstream side of the condenser 21 on the ORC cycle 2 and configured to expand the gaseous fire extinguishing agent. The fire extinguishing agent vaporized in the vaporizer 23 flows into the expansion turbine 24 in a gaseous state. The expansion turbine 24 is configured to expand the gaseous fire extinguishing agent and recover turbine rotational power from the gaseous fire extinguishing agent. As illustrated in FIGS. 2 to 11, the ORC cycle 2 may further include a generator 26 connected to the expansion turbine 24. The generator 26 is configured to be rotationally driven by the rotational power recovered by the expansion turbine 24 to generate electric power.

The ORC cycle 2 allows the expansion turbine 24 to output power by using the cold energy recovered from the first heat medium in the condenser 21. When the ORC cycle 2 includes the generator 26, the power output by the expansion turbine 24 can be converted into electric power.

Fire Extinguishing Agent Supply Line

The at least one fire extinguishing agent supply line 3 consists of a fire extinguishing agent supply system configured to feed the fire extinguishing agent from the ORC cycle 2 to the at least one fire prevention area 10. Each fire extinguishing agent supply line 3 has one end (upstream end) 31A/31B connected to the ORC cycle 2 and the other end (downstream end) 32A/32B connected to the fire prevention area 10. At least one fire extinguishing agent spray port 33A/33B configured to spray the fire extinguishing agent may be formed at the other end 32A/32B of each fire extinguishing agent supply line 3. Note that a plurality of fire extinguishing agent spray ports 33A/33B configured to spray the fire extinguishing agent to a plurality of respective fire prevention areas 10 may be formed at the other end 32A/32B of each fire extinguishing agent supply line 3.

Bypass Line and Bypass Valve

As illustrated in FIGS. 2 to 11, the ORC cycle 2 may further include a bypass line 27 configured to bypass the expansion turbine 24 and a bypass valve 28 provided on the bypass line 27. The bypass line 27 has one end (upstream end) connected to the downstream side of the vaporizer 23 and an upstream side of the expansion turbine 24 on the ORC cycle 2 and the other end (downstream end) connected to the downstream side of the expansion turbine 24 and an upstream side of the condenser 21 on the ORC cycle 2.

The bypass valve 28 includes a valve body, which is not illustrated. The valve body can open and close a flow path of the gaseous fire extinguishing agent on the bypass line 27. The bypass valve 28 is configured to control the flow rate of the gaseous fire extinguishing agent to be guided to a downstream side of the bypass valve 28 on the bypass line 27. Opening the bypass valve 28 causes the gaseous fire extinguishing agent flowing through the ORC cycle 2 to bypass the expansion turbine 24 and pass through the bypass line 27. Note that the bypass valve 28 may be an on-off valve whose degree of opening can be controlled to a fully closed state or a fully opened state or may be an opening control valve whose degree of opening can be controlled to a fully closed state, a fully opened state, or at least one intermediate opening degree between the fully closed state and the fully opened state.

As illustrated in FIGS. 2 to 11, the fire extinguishing equipment 1 according to some embodiments includes the ORC cycle 2 described above and the at least one fire extinguishing agent supply line 3 described above. In this case, a liquid or a gaseous fire extinguishing agent is fed from the ORC cycle 2 to the fire prevention area 10 via the fire extinguishing agent supply line 3 in case of fire at the fire prevention area 10. This allows the fire at the fire prevention area 10 to be extinguished. In ordinary times without the occurrence of a fire, the fire extinguishing agent is circulated as a working medium on the ORC cycle 2 to drive the expansion turbine 24. This allows the output of the expansion turbine 24 to be recovered. Using the fire extinguishing agent as a working medium on the ORC cycle 2 improves the economic efficiency of the fire extinguishing equipment 1 as compared to simply storing the fire extinguishing agent in the structure 11 including the fire prevention area 10.

Further, simply storing the fire extinguishing agent in the structure 11 including the fire prevention area 10 requires an occupied space for storing the fire extinguishing agent in the structure 11. In contrast, the configuration described above uses the fire extinguishing agent as a working medium on the ORC cycle 2 and thus eliminates the occupied space described above.

Liquid Fire Extinguishing Agent Supply Line

In some embodiments, as illustrated in FIGS. 2 to 7, 10, and 11, the at least one fire extinguishing agent supply line 3 described above includes a liquid fire extinguishing agent supply line 3A configured to feed a liquid fire extinguishing agent from the ORC cycle 2 to at least one fire prevention area (10A). The liquid fire extinguishing agent supply line 3A has one end (upstream end) 31A connected to the downstream side of the condenser 21 and the upstream side of the vaporizer 23 on the ORC cycle 2.

As illustrated in FIGS. 2, 4 to 7, and 10, the fire extinguishing equipment 1 may further include a first flow control valve 34A provided on the liquid fire extinguishing agent supply line 3A. The first flow control valve 34A includes a valve body, which is not illustrated. The valve body can open and close the flow path of the liquid fire extinguishing agent on the liquid fire extinguishing agent supply line 3A. The first flow control valve 34A is configured to control the flow rate of the liquid fire extinguishing agent to be guided to the fire prevention area 10A (10) connected to the other end 32A of the liquid fire extinguishing agent supply line 3A. Note that the first flow control valve 34A may be an on-off valve whose degree of opening can be controlled to a fully closed state or a fully opened state or may be an opening control valve whose degree of opening can be controlled to a fully closed state, a fully opened state, or at least one intermediate opening degree between the fully closed state and the fully opened state.

The first flow control valve 34A is configured to increase the degree of opening from the fully closed state when a fire alarm 7 (7A) provided at the fire prevention area 10A detects the occurrence of a fire at the fire prevention area 10A. Part of the liquid fire extinguishing agent flowing through the ORC cycle 2 is fed from the ORC cycle 2 to the liquid fire extinguishing agent supply line 3A through the one end 31A of the liquid fire extinguishing agent supply line 3A. The liquid fire extinguishing agent fed to the liquid fire extinguishing agent supply line 3A passes through the first flow control valve 34A and is sprayed to the fire prevention area 10A from the fire extinguishing agent spray port 33A formed at the other end 32A.

The configuration described above allows the liquid fire extinguishing agent to be fed from the ORC cycle 2 to the fire prevention area 10A (10) through the liquid fire extinguishing agent supply line 3A. The liquid fire extinguishing agent to be fed to the fire prevention area 10A, which has a low temperature equal to or lower than the liquefaction temperature, can draw heat from a burning object (fire heat source) at the fire prevention area 10A and reduce its temperature to an ignition temperature or lower. That is, the liquid fire extinguishing agent to be fed to the fire prevention area 10A can cool and extinguish the fire at the fire prevention area 10A.

Connecting Position of Liquid Fire Extinguishing Agent Supply Line

In some embodiments, as illustrated in FIGS. 2, 4 to 7, 10, and 11, the one end 31A of the liquid fire extinguishing agent supply line 3A described above is connected to the downstream side of the booster pump 22 and the upstream side of the vaporizer 23 on the ORC cycle 2. In this case, the pressure boosting action on the fire extinguishing agent by the booster pump 22 can be used to feed the liquid fire extinguishing agent to the fire prevention area 10 through the liquid fire extinguishing agent supply line 3A.

Figure 3:
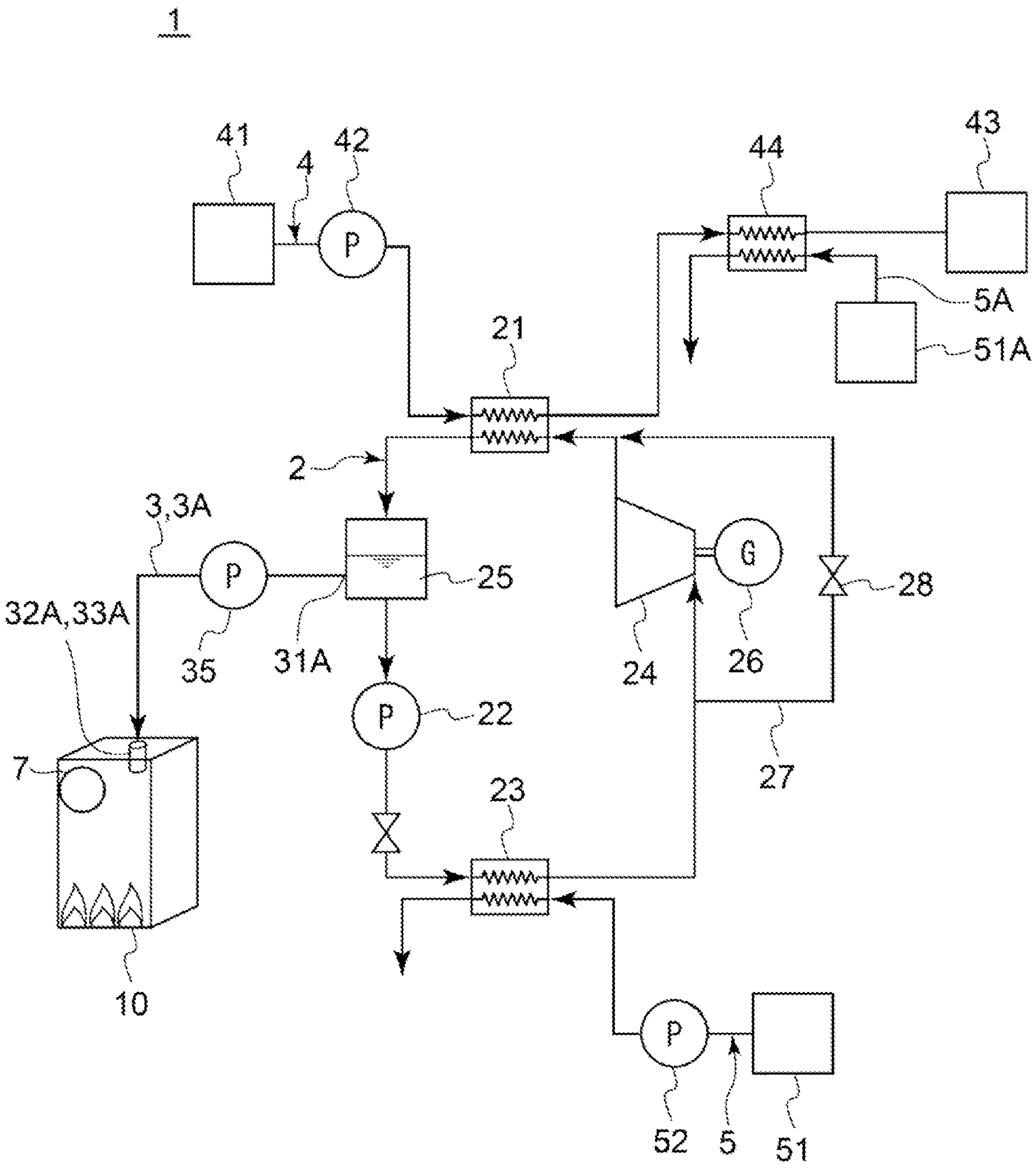
FIG. 3 is a schematic diagram of fire extinguishing equipment according to one embodiment.

Note that in other embodiments, the one end 31A of the liquid fire extinguishing agent supply line 3A described above may be connected to the downstream side of the condenser 21 and the upstream side of the booster pump 22 on the ORC cycle 2. When the ORC cycle 2 includes the fire extinguishing agent storage tank 25 as illustrated in FIG. 3, the above-described first end 31A of the liquid fire extinguishing agent supply line 3A is preferably connected to the downstream side of the fire extinguishing agent storage tank 25 on the ORC cycle 2 so that the liquid fire extinguishing agent stored in the fire extinguishing agent storage tank 25 can be used. As illustrated in FIG. 3, the one end 31A of the liquid fire extinguishing agent supply line 3A may be connected to the fire extinguishing agent storage tank 25.

Auxiliary Pump

The liquid fire extinguishing agent supply line 3A described above may include an auxiliary pump 35 that is provided on the liquid fire extinguishing agent supply line 3A and configured to pressurize the liquid fire extinguishing agent flowing through the liquid fire extinguishing agent supply line 3A. The auxiliary pump 35 is configured to pressurize the liquid fire extinguishing agent. Driving the auxiliary pump 35, causes the liquid fire extinguishing agent to be fed to a downstream side of the liquid fire extinguishing agent supply line 3A.

According to the configuration described above, when the booster pump 22 alone cannot boost pressure sufficient for feeding the liquid fire extinguishing agent to the fire prevention area 10 through the liquid fire extinguishing agent supply line 3A, providing the auxiliary pump 35 enables the pressure boosting sufficient for feeding the liquid fire extinguishing agent to the fire prevention area 10. For example, when the one end 31A of the liquid fire extinguishing agent supply line 3A is connected to the downstream side of the condenser 21 and the upstream side of the booster pump 22, the auxiliary pump 35 is preferably provided on the liquid fire extinguishing agent supply line 3A on the ORC cycle 2. In addition, according to the configuration described above, providing the auxiliary pump 35 eliminates the need for sufficient pressure boosting with the booster pump 22 alone and thus allows increase in size and cost of the booster pump 22 to be suppressed.

Gaseous Fire Extinguishing Agent Supply Line

In some embodiments, as illustrated in FIGS. 8 to 11, the at least one fire extinguishing agent supply line 3 described above includes a gaseous fire extinguishing agent supply line 3B configured to feed a gaseous fire extinguishing agent from the ORC cycle 2 to at least one fire prevention area (10B). The gaseous fire extinguishing agent supply line 3B has one end (upstream end) 31B connected to the downstream side of the vaporizer 23 and the upstream side of the condenser 21 on the ORC cycle 2.

As illustrated in FIGS. 8 to 11, the fire extinguishing equipment 1 may further include a second flow control valve 34B provided on the gaseous fire extinguishing agent supply line 3B. The second flow control valve 34B includes a valve body, which is not illustrated. The valve body can open and close the flow path of the gaseous fire extinguishing agent on the gaseous fire extinguishing agent supply line 3B. The second flow control valve 34B is configured to control the flow rate of the gaseous fire extinguishing agent to be guided to the fire prevention area 10B (10) connected to the other end 32B of the gaseous fire extinguishing agent supply line 3B. Note that the second flow control valve 34B may be an on-off valve whose degree of opening can be controlled to a fully closed state or a fully opened state or may be an opening control valve whose degree of opening can be controlled to a fully closed state, a fully opened state, or at least one intermediate opening degree between the fully closed state and the fully opened state.

The second flow control valve 34B is configured to increase the degree of opening from the fully closed state when a fire alarm 7 (7B) provided at the fire prevention area 10B detects the occurrence of a fire at the fire prevention area 10B. Part of the gaseous fire extinguishing agent flowing through the ORC cycle 2 is fed from the ORC cycle 2 to the gaseous fire extinguishing agent supply line 3B through the one end 31B of the gaseous fire extinguishing agent supply line 3B. The gaseous fire extinguishing agent fed to the gaseous fire extinguishing agent supply line 3B passes through the second flow control valve 34B and is sprayed to the fire prevention area 10B from a fire extinguishing agent spray port 33B formed at the other end 32B.

The configuration described above allows the gaseous fire extinguishing agent to be fed from the ORC cycle 2 to the fire prevention area 10B (10) through the gaseous fire extinguishing agent supply line 3B. The gaseous fire extinguishing agent to be fed to the fire prevention area 10B can shut off the supply of air to a burning object (fire heat source) at the fire prevention area 10B or dilute the oxygen concentration in the fire prevention area 10B. That is, the gaseous fire extinguishing agent to be fed to the fire prevention area 10B can extinguish the fire at the fire prevention area 10B by oxygen deficiency.

Connecting Position of Gaseous Fire Extinguishing Agent Supply Line

In some embodiments, as illustrated in FIGS. 8 to 11, the one end 31B of the gaseous fire extinguishing agent supply line 3B described above is connected to the bypass line 27. In this case, the gaseous fire extinguishing agent flowing through the bypass line 27 is not expanded in the expansion turbine 24, and the pressure boosting action by the booster pump 22 remains. Thus, the pressure boosting action on the fire extinguishing agent by the booster pump 22 can be used to feed the gaseous fire extinguishing agent to the fire prevention area 10 through the bypass line 27 and the gaseous fire extinguishing agent supply line 3B.

In some embodiments, as illustrated in FIGS. 8 to 11, the bypass valve 28 described above consists of a three-way valve 28A, and the one end 31B of the gaseous fire extinguishing agent supply line 3B is connected to one of the fluid inlet/outlet ports of the three-way valve 28A. The three-way value 28A can switch a feeding destination of the gaseous fire extinguishing agent between a downstream side of the three-way value 28A on the bypass line 27 and the gaseous fire extinguishing agent supply line 3B. In this case, the three-way valve 28A functions as the second flow control valve 34B described above, eliminating separately providing the second flow control valve 34B on the gaseous fire extinguishing agent supply line 3B. This allows the complication of the structure of the fire extinguishing equipment to be suppressed.

Note that in other embodiments, the one end 31B of the gaseous fire extinguishing agent supply line 3B described above may be connected to a circulation line connecting the vaporizer 23 and the condenser 21 on the ORC cycle 2. The expansion turbine 24 described above is provided on the circulation line. The one end and the other end of the bypass line 27 are connected to the circulation line. The one end 31B of the gaseous fire extinguishing agent supply line 3B described above is preferably connected to an upstream side rather than a downstream side of the expansion turbine 24 on the circulation line.

Auxiliary Compressor

Figure 11:
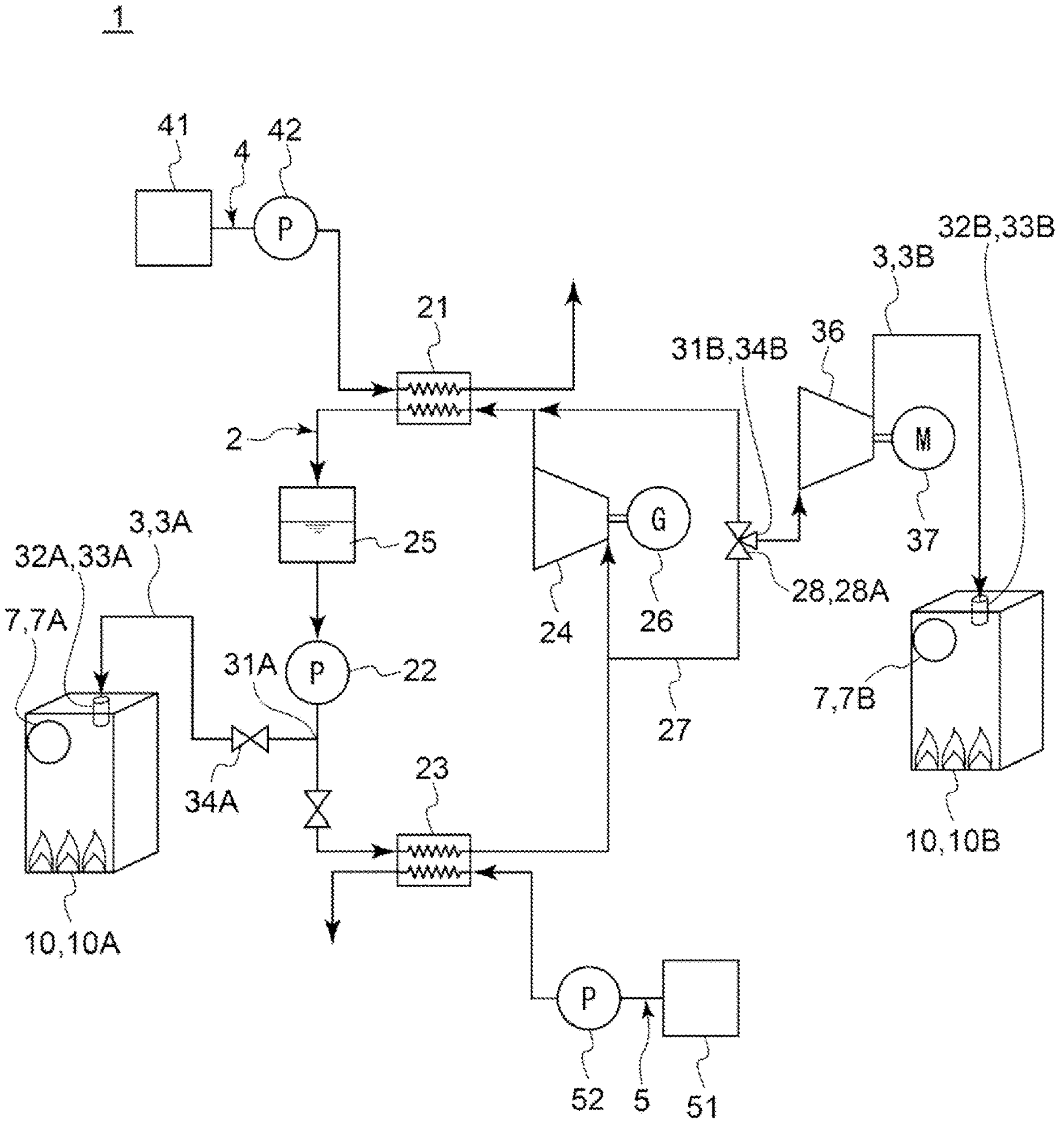
FIG. 11 is a schematic diagram of fire extinguishing equipment according to one embodiment.

In some embodiments, as illustrated in FIG. 11, the gaseous fire extinguishing agent supply line 3B described above may include an auxiliary compressor 36 that is provided on the gaseous fire extinguishing agent supply line 3B and configured to pressurize the gaseous fire extinguishing agent flowing through the gaseous fire extinguishing agent supply line 3B. The auxiliary compressor 36 is configured to pressurize the gaseous fire extinguishing agent. In the illustrated embodiment, the gaseous fire extinguishing agent supply line 3B may further include an electric motor 37 connected to the auxiliary compressor 36. The auxiliary compressor 36 is configured to be rotationally driven by rotational power converted from electric power and output by the electric motor 37 and to pressurize the gaseous fire extinguishing agent guided to the auxiliary compressor 36. Driving the auxiliary compressor 36 causes the gaseous fire extinguishing agent to be fed to a downstream side of the gaseous fire extinguishing agent supply line 3B.

According to the configuration described above, when the booster pump 22 alone cannot boost pressure sufficient for feeding the gaseous fire extinguishing agent to the fire prevention area 10 through the gaseous fire extinguishing agent supply line 3B, providing the auxiliary compressor 36 enables the pressure boosting sufficient for feeding the gaseous fire extinguishing agent to the fire prevention area 10. In addition, the configuration described above eliminates the need for sufficient pressure boosting with the booster pump 22 alone and thus allows increase in size and cost of the booster pump 22 to be suppressed.

Diverging Line and Fire Extinguishing Condenser

Figure 9:
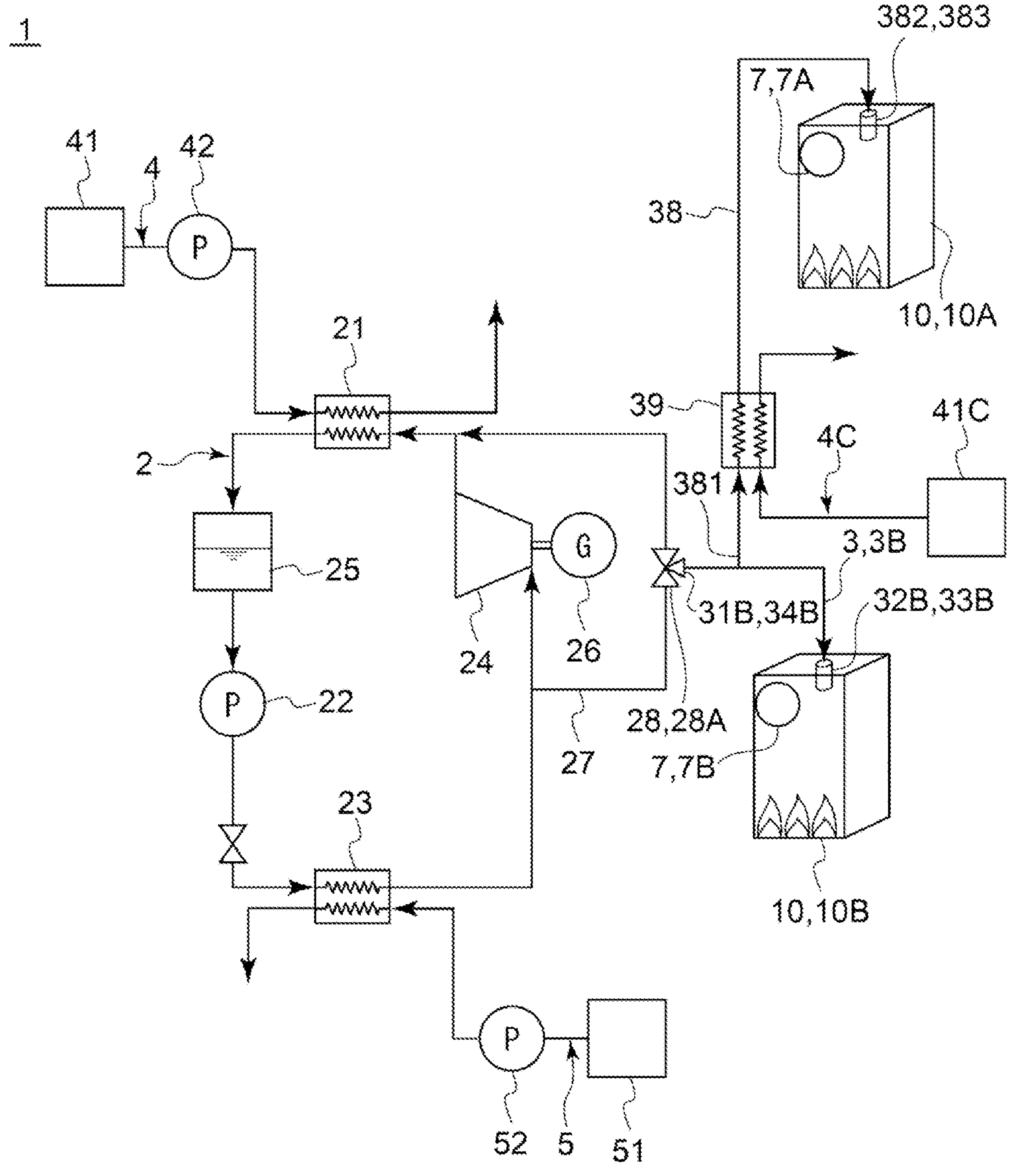
FIG. 9 is a schematic diagram of fire extinguishing equipment according to one embodiment.
Figure 10:
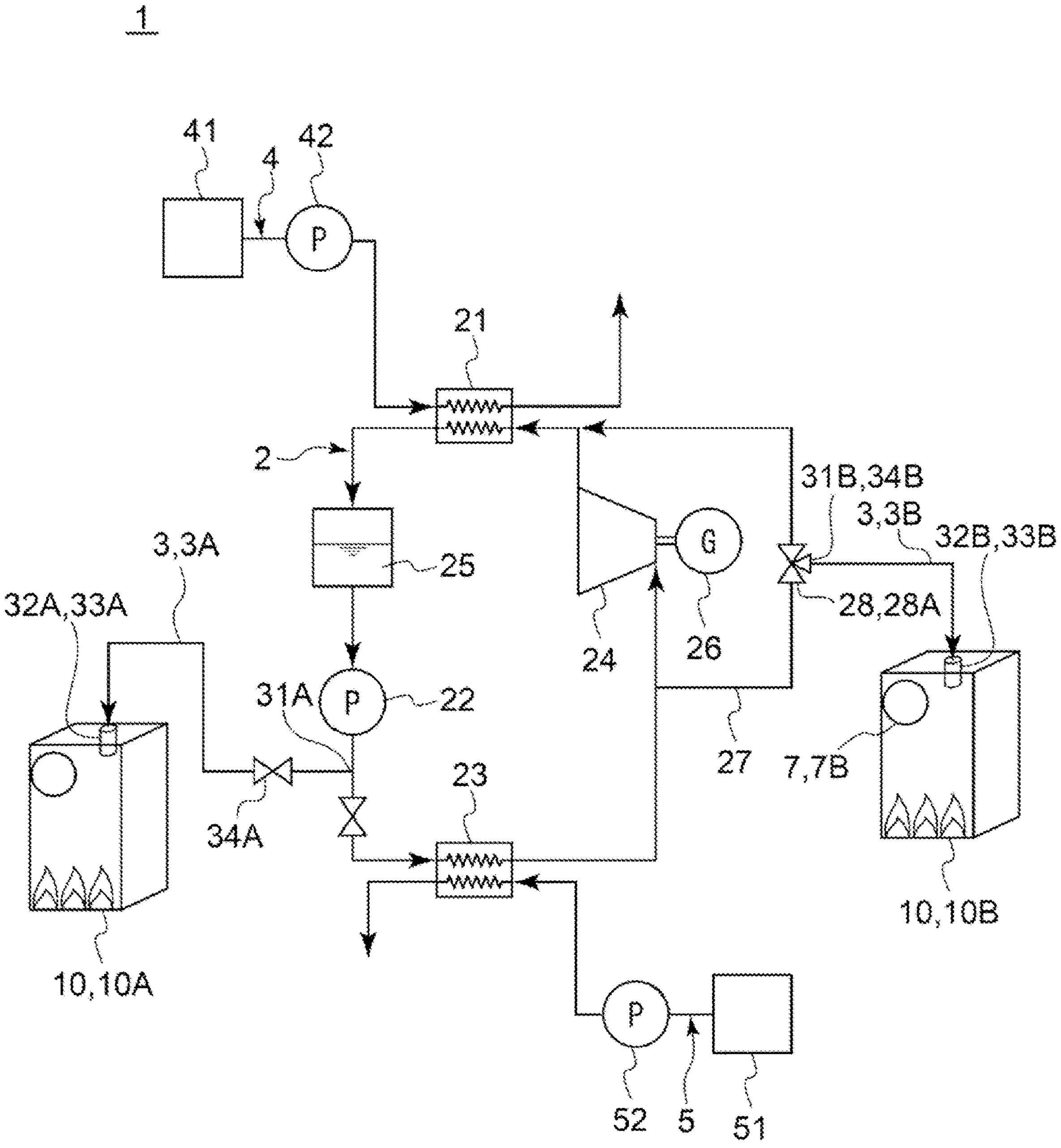
FIG. 10 is a schematic diagram of fire extinguishing equipment according to one embodiment.

In some embodiments, as illustrated in FIG. 9, the at least one fire extinguishing agent supply line 3 described above further includes a diverging line 38 having one end (upstream end) 381 connected to the gaseous fire extinguishing agent supply line 3B. The other end (downstream end) 382 of the diverging line 38 is connected to the fire prevention area 10. At least one fire extinguishing agent spray port 383 configured to spray the fire extinguishing agent may be formed at the other end 382 of the diverging line 38.

The diverging line 38 includes a fire extinguishing condenser 39 that is provided on the diverging line 38 and configured to liquefy the gaseous fire extinguishing agent. The fire extinguishing condenser 39 is configured to transfer cold energy from refrigerant (e.g., cooling water) flowing through a refrigerant supply line 4C to the gaseous fire extinguishing agent flowing through the diverging line 38 to liquefy the gaseous fire extinguishing agent.

The fire extinguishing condenser 39 is configured to allow heat exchange between the gaseous fire extinguishing agent flowing through the diverging line 38 and the refrigerant flowing through the refrigerant supply line 4C. The heat exchange in the fire extinguishing condenser 39 causes the gaseous fire extinguishing agent flowing through the diverging line 38 to be cooled and condensed (liquefied) by the refrigerant flowing through the refrigerant supply line 4C. As illustrated in FIG. 9, the fire extinguishing equipment 1 may further include the refrigerant supply line 4C and a refrigerant tank 41C configured to store the refrigerant in a liquid state to be fed to the refrigerant supply line 4C.

As illustrated in FIG. 9, the other end 32B of the gaseous fire extinguishing agent supply line 3B is connected to a first fire prevention area 10B included in the at least one fire prevention area 10, and the other end 382 of the diverging line 38 is connected to a second fire prevention area 10A that is different from the first fire prevention area 10B of the at least one fire prevention area 10.

According to the configuration described above, the fire extinguishing equipment 1 has selected, for each fire prevention area 10 that is a fire extinction target, feeding the liquid fire extinguishing agent through the liquid fire extinguishing agent supply line 3A or feeding the gaseous fire extinguishing agent through the gaseous fire extinguishing agent supply line 3B. Specifically, the fire extinguishing agent liquefied by the fire extinguishing condenser 39 provided on the diverging line 38 is fed to, of a plurality of fire extinction targets (fire prevention areas 10), a fire extinction target having people always stationed and having a concern about an influence on a human body in extinguishing a fire at the fire extinction target using the gaseous fire extinguishing agent, thus eliminating the concern described above. In addition, the gaseous fire extinguishing agent can be fed through the gaseous fire extinguishing agent supply line 3B to a fire extinction target having no people stationed.

In some embodiments, as illustrated in FIG. 11, the at least one fire extinguishing agent supply line 3 described above includes the liquid fire extinguishing agent supply line 3A described above and the gaseous fire extinguishing agent supply line 3B described above.

The configuration described above allows the liquid fire extinguishing agent to be fed from the ORC cycle 2 to the fire prevention area 10 through the liquid fire extinguishing agent supply line 3A, allowing a fire at the fire prevention area 10 to be extinguished by cooling. On the other hand, the gaseous fire extinguishing agent can be fed from the ORC cycle 2 to the fire prevention area 10 through the gaseous fire extinguishing agent supply line 3B, and thereby a fire at the fire prevention area 10 can be extinguished by oxygen deficiency.

In some embodiments, as illustrated in FIG. 11, the other end 32B of the gaseous fire extinguishing agent supply line 3B is connected to the first fire prevention area 10B included in the at least one fire prevention area 10, and the other end 32A of the liquid fire extinguishing agent supply line 3A is connected to the second fire prevention area 10A that is different from the first fire prevention area 10B of the at least one fire prevention area 10.

The gaseous fire extinguishing agent can be fed from the ORC cycle 2 to the first fire prevention area 10B through the gaseous fire extinguishing agent supply line 3B. The liquid fire extinguishing agent can be fed from the ORC cycle 2 to the second fire prevention area 10A through the liquid fire extinguishing agent supply line 3A.

According to the configuration described above, the fire extinguishing equipment 1 has selected, for each fire prevention area 10 that is a fire extinction target, feeding the liquid fire extinguishing agent through the liquid fire extinguishing agent supply line 3A or feeding the gaseous fire extinguishing agent through the gaseous fire extinguishing agent supply line 3B. Specifically, the fire extinguishing agent through the liquid fire extinguishing agent supply line 3A is fed to, of a plurality of fire extinction targets (fire prevention areas 10), a fire extinction target having people always stationed and having a concern about an influence on a human body in extinguishing a fire at the fire extinction target using the gaseous fire extinguishing agent, thus eliminating the concern described above. In addition, the gaseous fire extinguishing agent can be fed through the gaseous fire extinguishing agent supply line 3B to a fire extinction target having no people stationed.

In addition, the fire extinguishing equipment 1 described above allows the complication of the structure of the fire extinguishing equipment 1 to be suppressed and power consumption for feeding the refrigerant to a condenser (fire extinguishing condenser 39) to be reduced, as compared to the structure in which the gaseous fire extinguishing agent flowing through the gaseous fire extinguishing agent supply line 3B is liquefied by the condenser and then the liquid fire extinguishing agent is fed to the fire extinction target (second fire prevention area 10A) that is a target of fire extinction with the liquid fire extinguishing agent.

Combustion Device

Figure 4:
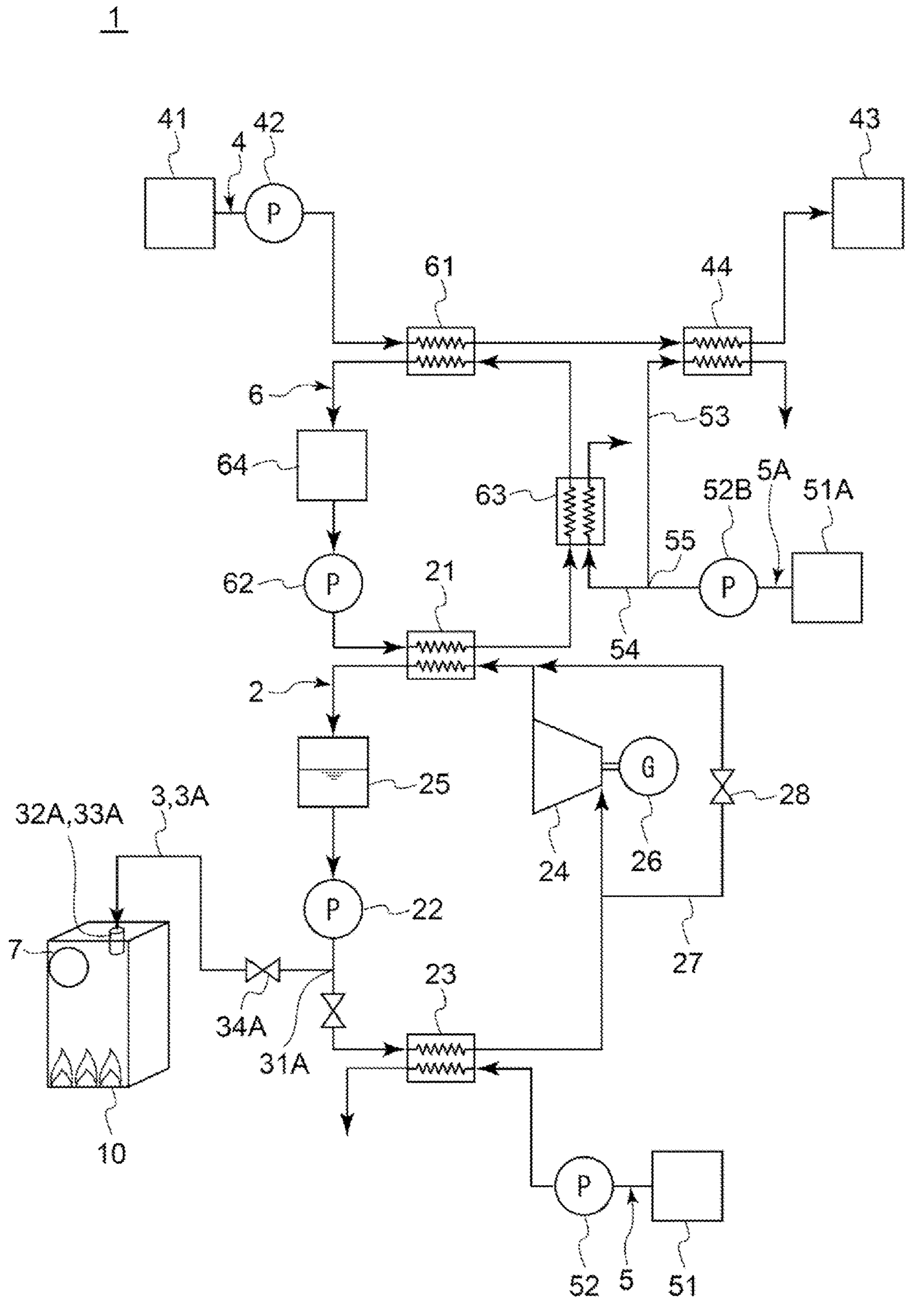
FIG. 4 is a schematic diagram of fire extinguishing equipment according to one embodiment.

In some embodiments, the first heat medium stored in the first heat medium tank 41 described above consists of liquefied gas having a liquefaction temperature (boiling temperature) lower than water. Examples of the liquefied gas include liquefied natural gas (LNG) and liquid hydrogen. In some embodiments, the fire extinguishing equipment 1 described above may further include a combustion device (e.g., a gas turbine) 43 configured to burn the first heat medium as illustrated in FIGS. 3 and 4. The combustion device 43 is connected to the other end (downstream end) of the first heat medium supply line 4, and is configured to receive the first heat medium vaporized on the first heat medium supply line 4.

Using the liquefied gas having a liquefaction temperature (boiling point) lower than water as the first heat medium allows the cold energy transferred from the first heat medium to the condenser 21 to be increased as compared to cooling water. Accordingly, the temperature difference between the heat source and the cold source on the ORC cycle 2 can be increased, and the output of the expansion turbine 24 can be increased.

First Heat Medium-Side Heater

As illustrated in FIGS. 3 and 4, the fire extinguishing equipment 1 described above may further include a first heat medium-side heater 44 that is provided on the first heat medium supply line 4 and configured to heat the first heat medium. The first heat medium-side heater 44 is provided on a downstream side of the condenser 21 or an intermediate cycle-side cooler 61 on the first heat medium supply line 4. The first heat medium in a gaseous state is heated to an appropriate temperature by the first heat medium-side heater 44 and then supplied to a supply destination of the first heat medium. The first heat medium-side heater 44 may be configured to heat the first heat medium by heat exchange between a heat medium flowing through a heat medium supply line 5A (e.g., refrigerant oil or refrigerant water that has recovered server waste heat) and the first heat medium flowing through the first heat medium supply line 4.

As illustrated in FIGS. 3 and 4, the fire extinguishing equipment 1 may further include the heat medium supply line 5A and a heat medium tank 51A configured to store the heat medium in a liquid state to be fed to the heat medium supply line 5A.

Intermediate Cycle

In some embodiments, as illustrated in FIG. 4, the fire extinguishing equipment 1 described above further includes an intermediate cycle 6 configured to circulate a third heat medium. The intermediate cycle 6 includes the intermediate cycle-side cooler 61, an intermediate cycle-side booster pump 62, and an intermediate cycle-side heater 63.

Intermediate Cycle-Side Cooler

The intermediate cycle-side cooler 61 is provided on a downstream side of the intermediate cycle-side heater 63 and on an upstream side of the intermediate cycle-side booster pump 62 on the intermediate cycle 6. The third heat medium heated in the intermediate cycle-side heater 63 flows into the intermediate cycle-side cooler 61. The intermediate cycle-side cooler 61 is provided on a downstream side of the first heat medium pump 42 on the first heat medium supply line 4 in substitution for the condenser 21. The intermediate cycle-side cooler 61 is configured to transfer cold energy from the first heat medium to the third heat medium.

The intermediate cycle-side cooler 61 is configured to allow heat exchange between the third heat medium flowing through the intermediate cycle 6 and the first heat medium flowing through the first heat medium supply line 4. The heat exchange in the intermediate cycle-side cooler 61 causes the third heat medium flowing through the intermediate cycle 6 to be cooled by the first heat medium flowing through the first heat medium supply line 4.

Intermediate Cycle-Side Booster Pump

The intermediate cycle-side booster pump 62 is provided on a downstream side of the intermediate cycle-side cooler 61 on the intermediate cycle 6. The third heat medium that has been cooled in the intermediate cycle-side cooler 61 flows into the intermediate cycle-side booster pump 62 in a liquid state. The intermediate cycle-side booster pump 62 is configured to pressurize the third heat medium in a liquid state. Driving the intermediate cycle-side booster pump 62 causes the third heat medium to be circulated on the intermediate cycle 6.

Intermediate Cycle-Side Storage Tank

The intermediate cycle 6 may further include an intermediate cycle-side storage tank 64 provided on a downstream side of the intermediate cycle-side cooler 61 and an upstream side of the intermediate cycle-side booster pump 62 on the intermediate cycle 6. The intermediate cycle-side storage tank 64 is configured to store the third heat medium that has been cooled in the intermediate cycle-side cooler 61. Driving the intermediate cycle-side booster pump 62 causes the third heat medium stored in the intermediate cycle-side storage tank 64 to be fed to a downstream side of the intermediate cycle-side storage tank 64 on the intermediate cycle 6.

Condenser

The condenser 21 is provided on a downstream side of the expansion turbine 24 and on an upstream side of the booster pump 22 on the ORC cycle 2. In addition, the condenser 21 is provided on a downstream side of the intermediate cycle-side booster pump 62 and an upstream side of the intermediate cycle-side heater 63 on the intermediate cycle 6. The condenser 21 is configured to exchange heat between the gaseous fire extinguishing agent flowing through the ORC cycle 2 and the third heat medium flowing through the intermediate cycle 6. The heat exchange in the condenser 21 causes the gaseous fire extinguishing agent flowing through the ORC cycle 2 to be cooled and condensed (liquefied) by the third heat medium flowing through the intermediate cycle 6. Further, the third heat medium flowing through the intermediate cycle 6 is heated to have an increased temperature by the gaseous fire extinguishing agent flowing through the ORC cycle 2.

Intermediate Cycle-Side Heater

The intermediate cycle-side heater 63 is provided on a downstream side of the intermediate cycle-side booster pump 62 and the condenser 21 and on an upstream side of the intermediate cycle-side cooler 61 on the intermediate cycle 6. The intermediate cycle-side heater 63 is configured to transfer heat energy from a fourth heat medium to the third heat medium flowing through the intermediate cycle 6 to increase the temperature of the third heat medium.

In the embodiment illustrated in FIG. 4, the heat medium supply line 5A includes a first heat medium supply line 53 configured to feed a heat medium to the first heat medium-side heater 44, and a second heat medium supply line 54 configured to feed a heat medium (fourth heat medium) to the intermediate cycle-side heater 63. The first heat medium supply line 53 and the second heat medium supply line 54 diverge from each other at a diverging portion 55 on the heat medium supply line 5A. The heat medium supply line 5A may include a heat medium-side pump 52B configured to feed the heat medium to an upstream side of the diverging portion 55 on the heat medium supply line 5A.

According to the configuration described above, providing the intermediate cycle 6 facilitates the control of the temperature and the pressure of the fire extinguishing agent flowing through the ORC cycle 2, and thus the controllability of the ORC cycle 2 can be improved.

In some embodiments, the booster pump 22 described above is configured to control a pressure ratio that is a ratio of the discharge pressure (outlet pressure) to the inlet pressure of the booster pump 22. Controlling the pressure ratio of the booster pump 22 allows the pressure of the liquid fire extinguishing agent discharged from the booster pump 22 to be controlled and a delivery distance of the fire extinguishing agent to be controlled. In this case, the delivery distance of the fire extinguishing agent can be increased compared to a conventional configuration in which nitrogen gas is delivered to a fire extinction target by an internal pressure of a cylinder, and thus the degree of freedom of the layout of the fire extinguishing equipment 1 in the structure 11 is improved.

Figure 5:
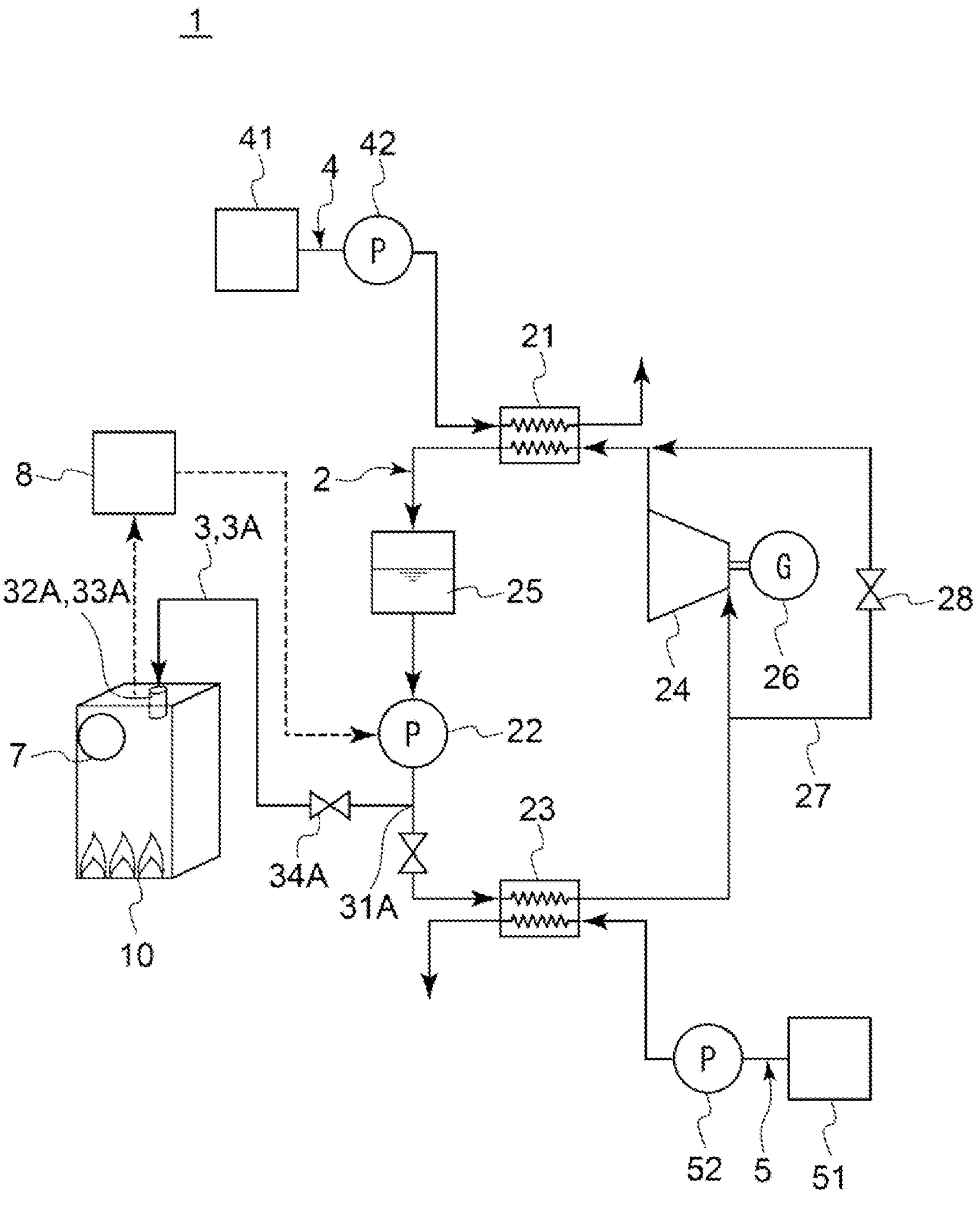
FIG. 5 is a schematic diagram of fire extinguishing equipment according to one embodiment.

In some embodiments, as illustrated in FIG. 5 for example, the fire extinguishing equipment 1 described above includes the fire alarm 7 provided at the at least one fire prevention area 10, and the flow control valve 34A/34B provided on the at least one fire extinguishing agent supply line 3. The fire extinguishing equipment 1 is configured to open the flow control valve 34A/34B and increase the pressure ratio of the booster pump 22 upon receipt of a fire alarm signal from the fire alarm 7.

In the illustrated embodiment, the fire extinguishing equipment 1 includes a control device 8 configured to control devices included in the fire extinguishing equipment 1. The control device 8 is an electronic control unit configured to control the devices included in the fire extinguishing equipment 1. The control device 8 is configured as a microcomputer including a processor (CPU), a memory such as a ROM and a RAM, a storage device such as an external storage device, an I/O interface, and a communication interface, which is not illustrated. The control device 8 may implement the control of the devices included in the fire extinguishing equipment 1 by the CPU operating (for example, calculation of data or the like) in accordance with a command of a program loaded into a main storage device of the memory described above, for example.

The control device 8 is configured to receive a fire alarm signal from the fire alarm 7. In addition, the control device 8 is configured to allow an instruction on drive or stop to the pumps included in the fire extinguishing equipment 1 (booster pump 22 and the like) and an instruction on a pressure ratio of the booster pump 22 to the booster pump 22. Further, the control device 8 is configured to allow an instruction on a degree of opening to the valves included in the fire extinguishing equipment 1 (flow control valve 34A/34B, and the like).

Upon receipt of a fire alarm signal from a fire alarm 7, the control device 8 instructs the flow control valve 34A/34B provided on the fire extinguishing agent supply line 3, which is to feed the fire extinguishing agent to the fire prevention area 10 provided with the fire alarm 7, to increase the degree of opening from the fully closed state. In addition, upon receipt a fire alarm signal from the fire alarm 7, the control device 8 instructs the booster pump 22 to increase the pressure ratio of the booster pump 22 to be higher than a set pressure ratio that is set for ordinary times before the receipt of the fire alarm signal from the fire alarm 7.

According to the configuration described above, in ordinary times without the occurrence of a fire, increase in the power consumption of the ORC cycle 2 is suppressed by setting the pressure ratio of the booster pump 22 to be low, enabling the economical operation of the ORC cycle 2. In case of fire at the fire prevention area 10, the fire alarm signal transmitted by the fire alarm 7 is received, the flow control valve 34A/34B is opened, and the pressure ratio of the booster pump 22 is increased, thus allowing the discharge pressure of the booster pump 22 to be increased to an appropriate pressure for delivering the fire extinguishing agent to the fire prevention area 10 and the fire extinguishing agent to be delivered to the fire prevention area 10 without excess or deficiency.

Liquid Fire Extinguishing Agent Recovery Line

Figure 6:
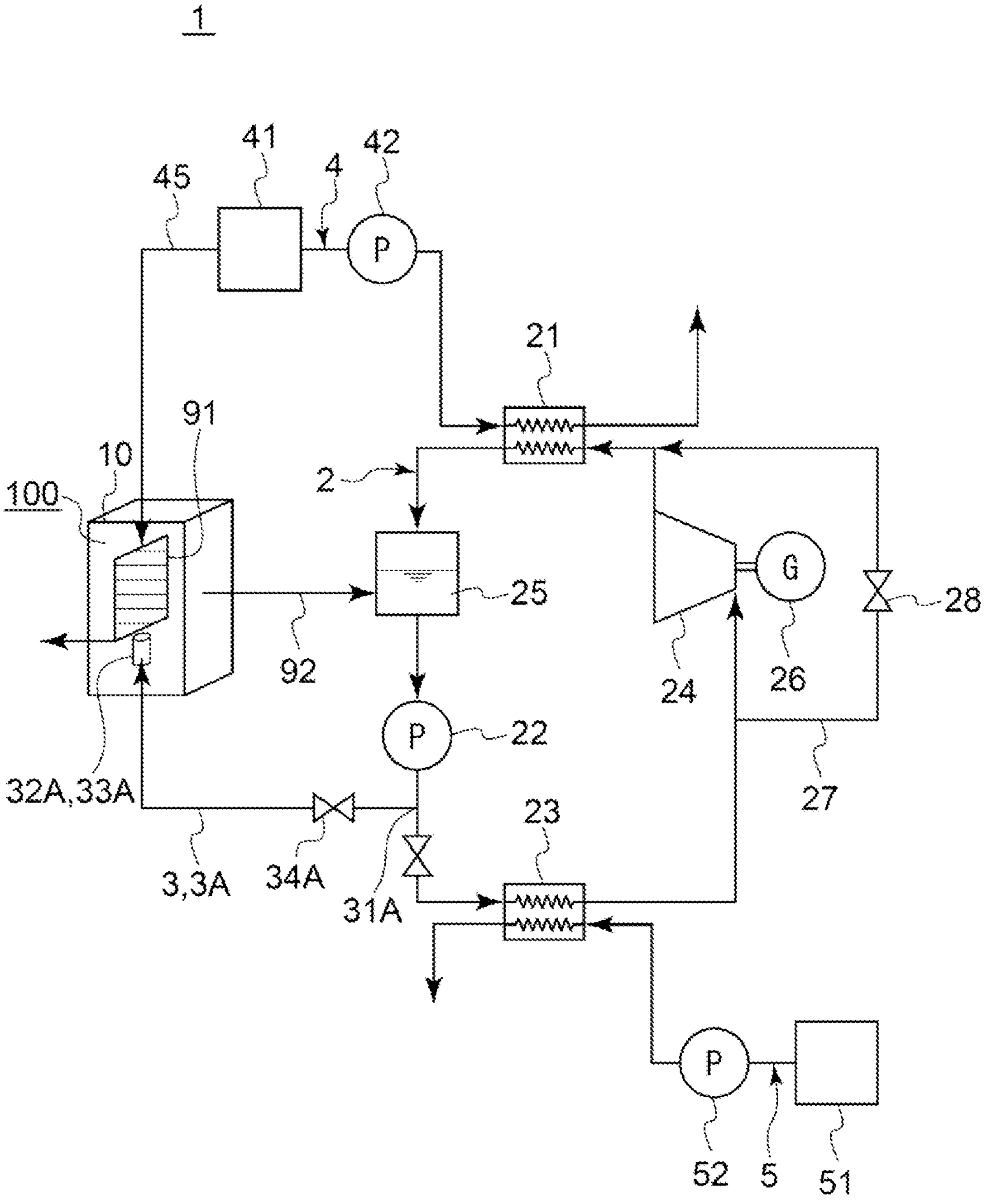
FIG. 6 is a schematic diagram of fire extinguishing equipment according to one embodiment.

In some embodiments, as illustrated in FIG. 6, each of the at least one fire prevention area 10 described above includes an interior space 100 into which the fire extinguishing agent is introduced. The fire extinguishing equipment 1 described above further includes a first fire extinguishing equipment-side condenser 91 configured to transfer cold energy from a fifth heat medium to the fire extinguishing agent sprayed into the interior space 100 to liquefy the fire extinguishing agent and a liquid fire extinguishing agent recovery line 92 configured to guide the fire extinguishing agent liquefied by the first fire extinguishing equipment-side condenser 91 to the fire extinguishing agent storage tank 25. The fire extinguishing agent sprayed in the interior space 100 is in a gaseous state.

The first fire extinguishing equipment-side condenser 91 is disposed in the interior space 100. The first fire extinguishing equipment-side condenser 91 may be configured to allow heat exchange between the gaseous fire extinguishing agent present in the interior space 100 and the fifth heat medium (refrigerant) flowing through the refrigerant supply line 45. As illustrated in FIG. 6, the upstream end of the refrigerant supply line 45 is connected to the first heat medium tank 41, and the fifth heat medium flowing through the refrigerant supply line 45 may be the first heat medium fed from the first heat medium tank 41.

The fire extinguishing agent that has been liquefied in the first fire extinguishing equipment-side condenser 91 is returned to the fire extinguishing agent storage tank 25 via the liquid fire extinguishing agent recovery line 92.

According to the configuration described above, the fire extinguishing agent sprayed in the interior space 100 of the fire prevention area 10 can be liquefied and then returned to the fire extinguishing agent storage tank 25. In this case, recovering and reusing the fire extinguishing agent sprayed in the interior space 100 allows the consumption of the fire extinguishing agent that is expensive to be reduced, allowing the economic efficiency of the fire extinguishing equipment 1 to be improved. The present embodiment can be suitably used for the fire prevention area 10 which has a high sealing performance and from which a fire extinguishing agent is less likely to leak, such as the server rack 13.

Gaseous Fire Extinguishing Agent Recovery Line

Figure 7:
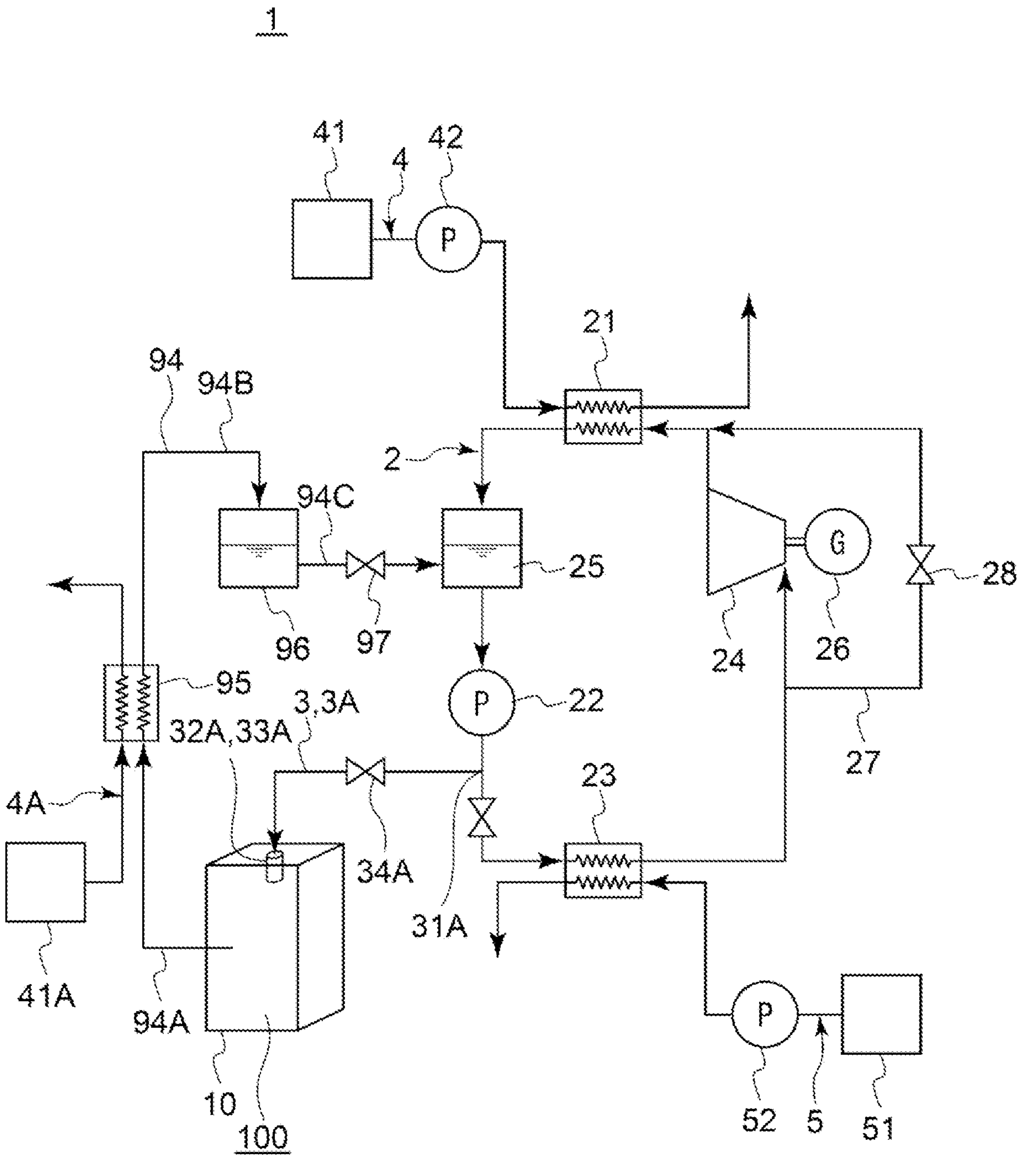
FIG. 7 is a schematic diagram of fire extinguishing equipment according to one embodiment.
Figure 8:
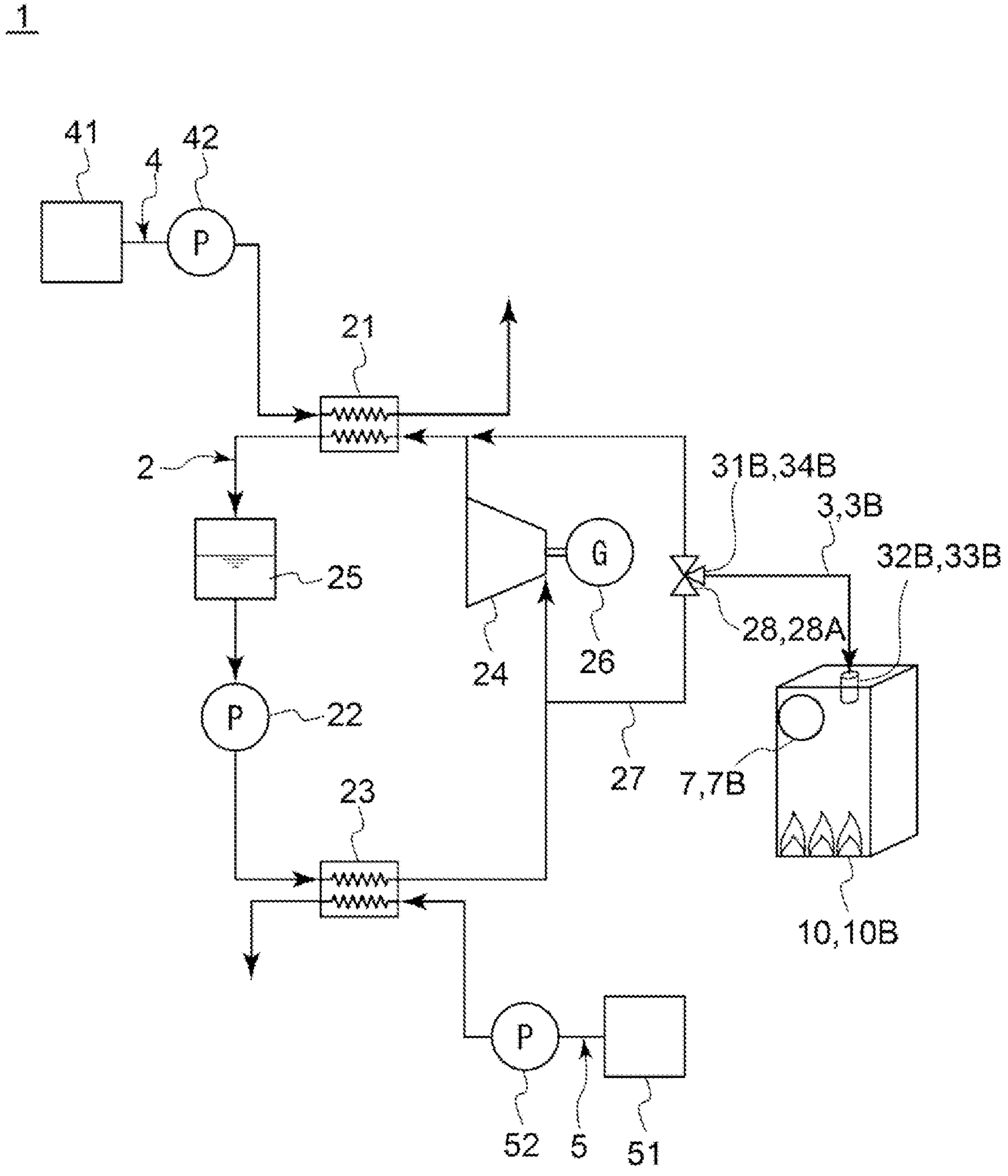
FIG. 8 is a schematic diagram of fire extinguishing equipment according to one embodiment.

In some embodiments, as illustrated in FIG. 7, each of the at least one fire prevention area 10 described above includes the interior space 100 into which the fire extinguishing agent is introduced. The fire extinguishing equipment 1 described above further includes a gaseous fire extinguishing agent recovery line 94 configured to extract the gas (air) containing the fire extinguishing agent sprayed in the interior space 100 from the interior space 100 and return the liquefied fire extinguishing agent to the fire extinguishing agent storage tank 25.

The gaseous fire extinguishing agent recovery line 94 includes a second fire extinguishing equipment-side condenser 95 provided on the gaseous fire extinguishing agent recovery line 94 and a gas-liquid separator 96 provided on a downstream side of the second fire extinguishing equipment-side condenser 95 on the gaseous fire extinguishing agent recovery line 94.

In the illustrated embodiment, the gaseous fire extinguishing agent recovery line 94 further includes a first gaseous fire extinguishing agent recovery line 94A configured to guide gas containing a fire extinguishing agent from the interior space 100 to the second fire extinguishing equipment-side condenser 95, a second gaseous fire extinguishing agent recovery line 94B configured to guide the fire extinguishing agent liquefied in the second fire extinguishing equipment-side condenser 95 to the gas-liquid separator 96, a third gaseous fire extinguishing agent recovery line 94C configured to guide the liquid fire extinguishing agent separated from the gas (air) in the gas-liquid separator 96 to the fire extinguishing agent storage tank 25, and a recovery line-side flow control valve 97 that is provided on the third gaseous fire extinguishing agent recovery line 94C and configured to control the flow rate of the liquid fire extinguishing agent flowing through the third gaseous fire extinguishing agent recovery line 94C.

The second fire extinguishing equipment-side condenser 95 is disposed outside the fire prevention area 10. The second fire extinguishing equipment-side condenser 95 may be configured to allow heat exchange between the gaseous fire extinguishing agent flowing through the gaseous fire extinguishing agent recovery line 94 and refrigerant flowing through a refrigerant supply line 4A. The heat exchange in the second fire extinguishing equipment-side condenser 95 causes the gaseous fire extinguishing agent contained in the gas (air) to be cooled and condensed (liquefied) by the refrigerant flowing through the refrigerant supply line 4A. The air (non-condensable gas) is not condensed through the heat exchange in the second fire extinguishing equipment-side condenser 95. As illustrated in FIG. 7, the fire extinguishing equipment 1 may further include the refrigerant supply line 4A and a refrigerant tank 41A configured to store the refrigerant in a liquid state to be fed to the refrigerant supply line 4A.

The gas-liquid separator 96 is configured to separate the liquid fire extinguishing agent from the air. Removing the air (non-condensable gas) from the liquid fire extinguishing agent to be returned to the fire extinguishing agent storage tank 25 allows reduction in the heat exchange performance on the ORC cycle 2 to be suppressed. During the operation of the ORC cycle 2, the internal pressure of the fire extinguishing agent storage tank 25 becomes lower than the internal pressure of the gas-liquid separator 96. Thus, by opening the recovery line-side flow control valve 97, the liquid fire extinguishing agent is sucked from the gas-liquid separator 96 into the fire extinguishing agent storage tank 25.

The configuration described above can liquefy the fire extinguishing agent sprayed in the interior space 100 of the fire prevention area 10, separate the fire extinguishing agent from the air, and then return the fire extinguishing agent to the fire extinguishing agent storage tank 25. In this case, recovering the fire extinguishing agent from the air containing the sprayed fire extinguishing agent allows the consumption of the fire extinguishing agent that is expensive to be reduced, allowing the economic efficiency of the fire extinguishing equipment 1 to be improved. In addition, according to the configuration described above, draining the gas containing the gaseous fire extinguishing agent via the first gaseous fire extinguishing agent recovery line 94A simultaneously with the spraying of the fire extinguishing agent into the interior space 100 of the fire prevention area 10 allows the internal pressure of the fire prevention area 10 to be prevented from becoming excessively high. The present embodiment can be suitably used for the fire prevention area 10 which has a high sealing performance and from which a fire extinguishing agent is less likely to leak, such as the server rack 13.

In the present specification, an expression of relative or absolute arrangement such as "in a direction", "along a direction", "parallel", "orthogonal", "centered", "concentric" or "coaxial" shall not be construed as indicating only the arrangement in a strict literal sense, and also includes a state where the arrangement is relatively displaced by a tolerance, or by an angle or a distance that can still achieve the same function.

For example, expressions indicating a state of being equal such as "same," "equal," or "uniform" shall not be construed as indicating only a state of being strictly equal but also as indicating a state in which there is a tolerance or a difference as long as the same function can be obtained.

In addition, in the present specification, an expression of a shape such as a rectangular shape or a cylindrical shape shall not be construed as only a geometrically strict shape, and also includes a shape with unevenness or chamfered corners or the like within the range in which the same effect can be achieved.

In addition, in the present specification, an expression such as "comprising", "including", or "having" one component is not intended to be exclusive of other components.

The disclosure is not limited to the above-described embodiments, and includes embodiments obtained by modifying the above-described embodiments and embodiments obtained by appropriately combining these embodiments.

The contents of the embodiments described above can be understood as follows, for example.

1) The fire extinguishing equipment (1) according to at least one embodiment of the disclosure includes an ORC cycle (2) configured to circulate a fire extinguishing agent as a working medium and at least one fire extinguishing agent supply line (3). The ORC cycle (2) includes a condenser (21) provided on the ORC cycle (2) and configured to transfer cold energy from a first heat medium to a gaseous fire extinguishing agent that is the fire extinguishing agent in a gas state to liquefy the gaseous fire extinguishing agent, a booster pump (22) provided on a downstream side of the condenser (21) on the ORC cycle (2) and configured to pressurize a liquid fire extinguishing agent obtained by liquefying the gaseous fire extinguishing agent in the condenser (21), a vaporizer (23) provided on a downstream side of the booster pump (22) on the ORC cycle (2) and configured to transfer heat energy from a second heat medium to the liquid fire extinguishing agent to vaporize the liquid fire extinguishing agent, and an expansion turbine (24) provided on a downstream side of the vaporizer (23) and on an upstream side of the condenser (21) on the ORC cycle (2) and configured to be driven by a gaseous fire extinguishing agent obtained by vaporizing the liquid fire extinguishing agent. The at least one fire extinguishing agent supply line (3) is configured to extract at least one of the liquid fire extinguishing agent or the gaseous fire extinguishing agent from the ORC cycle (2) and supply at least one of the liquid fire extinguishing agent or the gaseous fire extinguishing agent to at least one fire prevention area (10).

According to the configuration of 1) described above, the liquid or gaseous fire extinguishing agent is fed from the ORC cycle (2) to the fire prevention area (10) via the fire extinguishing agent supply line (3) in case of fire at the fire prevention area (10). This allows the fire at the fire prevention area (10) to be extinguished. In ordinary times without the occurrence of a fire, the fire extinguishing agent is circulated as a working medium on the ORC cycle (2) to drive the expansion turbine (24) so that the output of the expansion turbine (24) can be recovered. Using the fire extinguishing agent as a working medium on the ORC cycle (2) improves the economic efficiency of the fire extinguishing equipment (1) as compared to simply storing the fire extinguishing agent in a structure including the fire prevention area (10).

Further, simply storing the fire extinguishing agent in the structure including the fire prevention area (10) requires an occupied space for storing the fire extinguishing agent in the structure. In contrast, the configuration of 1) described above uses the fire extinguishing agent as a working medium on the ORC cycle (2) and thus eliminates the occupied space described above.

2) In some embodiments, in the fire extinguishing equipment (1) according to 1) described above, the at least one fire extinguishing agent supply line (3) includes a liquid fire extinguishing agent supply line (3A) configured to feed the liquid fire extinguishing agent from the ORC cycle (2) to the at least one fire prevention area (10). The liquid fire extinguishing agent supply line (3A) has one end (31A) connected to the downstream side of the condenser (21) and an upstream side of the vaporizer (23) on the ORC cycle (2).

The configuration of 2) described above can feed the liquid fire extinguishing agent from the ORC cycle (2) to the fire prevention area (10) through the liquid fire extinguishing agent supply line (3A). The liquid fire extinguishing agent to be fed to the fire prevention area (10), which has a low temperature equal to or lower than the liquefaction temperature, can draw heat from a burning object (fire heat source) at the fire prevention area (10) and reduce its temperature to an ignition temperature or lower. That is, the liquid fire extinguishing agent to be fed to the fire prevention area (10) can cool and extinguish the fire at the fire prevention area (10).

3) In some embodiments, in the fire extinguishing equipment (1) according to 1) described above, the at least one fire extinguishing agent supply line (3) includes a gaseous fire extinguishing agent supply line (3B) configured to feed the gaseous fire extinguishing agent from the ORC cycle (2) to the at least one fire prevention area (10). The gaseous fire extinguishing agent supply line (3B) has one end (31B) connected to a downstream side of the vaporizer (23) and an upstream side of the condenser (21) on the ORC cycle (2).

The configuration of 3) described above can feed the gaseous fire extinguishing agent from the ORC cycle 2 to the fire prevention area (10) through the gaseous fire extinguishing agent supply line (3B). The gaseous fire extinguishing agent to be fed to the fire prevention area (10) can shut off the supply of air to a burning object (fire heat source) at the fire prevention area (10) or dilute the oxygen concentration in the fire prevention area (10). That is, the gaseous fire extinguishing agent to be fed to the fire prevention area (10) can extinguish the fire at the fire prevention area (10) by oxygen deficiency.

4) In some embodiments, in the fire extinguishing equipment (1) according to 1) described above, the at least one fire extinguishing agent supply line (3) includes a liquid fire extinguishing agent supply line (3A) and a gaseous fire extinguishing agent supply line (3B). The liquid fire extinguishing agent supply line (3A) is configured to feed the liquid fire extinguishing agent from the ORC cycle (2) to the at least one fire prevention area (10) and has one end (31A) connected to the ORC cycle (2) on a downstream side of the condenser (21) and on an upstream side of the vaporizer (23) on the ORC cycle (2). The gaseous fire extinguishing agent supply line (3B) is configured to feed the gaseous fire extinguishing agent from the ORC cycle (2) to the at least one fire prevention area (10) and has one end (31B) connected to a downstream side of the vaporizer (23) and an upstream side of the condenser (21) on the ORC cycle (2).

The configuration of 4) described above allows the liquid fire extinguishing agent to be fed from the ORC cycle (2) to the fire prevention area (10) through the liquid fire extinguishing agent supply line (3A), allowing a fire at the fire prevention area (10) to be extinguished by cooling. In addition, the gaseous fire extinguishing agent can be fed from the ORC cycle (2) to the fire prevention area (10) through the gaseous fire extinguishing agent supply line (3B). This can extinguish a fire at the fire prevention area (10) by oxygen deficiency.

5) In some embodiments, in the fire extinguishing equipment (1) according to 4) described above, the other end (32B) of the gaseous fire extinguishing agent supply line (3B) is connected to a first fire prevention area (10B) included in the at least one fire prevention area (10), and the other end (32A) of the liquid fire extinguishing agent supply line 3A is connected to a second fire prevention area (10A) that is different from the first fire prevention area (10B) of the at least one fire prevention area (10).

According to the configuration 5) described above, the fire extinguishing equipment (1) has selected for each fire prevention area (10) that is a fire extinction target, feeding the liquid fire extinguishing agent through the liquid fire extinguishing agent supply line (3A) or feeding the gaseous fire extinguishing agent through the gaseous fire extinguishing agent supply line (3B). Specifically, the liquid fire extinguishing agent through the liquid fire extinguishing agent supply line (3A) is fed to, of a plurality of fire extinction targets (fire prevention areas 10), a fire extinction target having people always stationed and having a concern about an influence on a human body in extinguishing a fire at the fire extinction target using the gaseous fire extinguishing agent, thus eliminating the concern described above. In addition, the gaseous fire extinguishing agent can be fed through the gaseous fire extinguishing agent supply line (3B) to a fire extinction target having no people stationed.

Further, the fire extinguishing equipment (1) according to 5) described above allows the complication of the structure of the fire extinguishing equipment (1) to be suppressed and power consumption for feeding the refrigerant to a condenser (fire extinguishing condenser 39) to be reduced, as compared to the structure in which the gaseous fire extinguishing agent flowing through the gaseous fire extinguishing agent supply line (3B) is liquefied by the condenser and then the liquid fire extinguishing agent is fed to the fire extinction target (second fire prevention area 10A) that is a target of fire extinction with the liquid fire extinguishing agent.

6) In some embodiments, in the fire extinguishing equipment (1) according to 3) described above, the at least one fire extinguishing agent supply line (3) further includes a diverging line (38) having one end (381) connected to the gaseous fire extinguishing agent supply line (3B) and including a fire extinguishing condenser (39) that is provided on the diverging line (38) and configured to liquefy the gaseous fire extinguishing agent. The other end (32B) of the gaseous fire extinguishing agent supply line (3B) is connected to one fire prevention area (10B) of the at least one fire prevention area (10). The other end (382) of the diverging line (38) is connected to a second fire prevention area (10A) that is different from the first fire prevention area (10B) and is included in the at least one fire prevention area (10).

According to the configuration 6) described above, the fire extinguishing equipment (1) has selected for each fire prevention area (10) that is a fire extinction target, feeding the liquid fire extinguishing agent through the liquid fire extinguishing agent supply line (3A) or feeding the gaseous fire extinguishing agent through the gaseous fire extinguishing agent supply line (3B). Specifically, the fire extinguishing agent liquefied by the fire extinguishing condenser (39) provided on the diverging line (38) is fed to, of a plurality of fire extinction targets (fire prevention areas 10), a fire extinction target having people always stationed and having a concern about an influence on a human body in extinguishing a fire at the fire extinction target using the gaseous fire extinguishing agent, thus eliminating the concern described above. In addition, the gaseous fire extinguishing agent can be fed through the gaseous fire extinguishing agent supply line (3B) to a fire extinction target having no people stationed.

7) In some embodiments, in the fire extinguishing equipment (1) according to any one of 2), 4), and 5) described above, the one end (31A) of the liquid fire extinguishing agent supply line (3A) is connected to a downstream side of the booster pump (22) and an upstream side of the vaporizer (23) on the ORC cycle (2).

The configuration of 7) described above allows the pressure boosting action on the fire extinguishing agent by the booster pump (22) to be used to feed the liquid fire extinguishing agent to the fire prevention area (10) through the liquid fire extinguishing agent supply line (3A).

8) In some embodiments, in the fire extinguishing equipment (1) according to any one of 2), 4), 5), and 7) described above, the liquid fire extinguishing agent supply line (3A) includes an auxiliary pump (35) that is provided on the liquid fire extinguishing agent supply line (3A) and configured to pressurize the liquid fire extinguishing agent flowing through the liquid fire extinguishing agent supply line (3A).

According to the configuration of 8) described above, when the booster pump (22) alone cannot boost pressure sufficient for feeding the liquid fire extinguishing agent to the fire prevention area (10) through the liquid fire extinguishing agent supply line (3A), providing the auxiliary pump (35) enables the pressure boosting sufficient for feeding the liquid fire extinguishing agent to the fire prevention area (10). In addition, the configuration of 8) described above eliminates the need for the sufficient pressure boosting with the booster pump (22) alone and thus allows increase in size and cost of the booster pump (22) to be suppressed.

9) In some embodiments, in the fire extinguishing equipment (1) according to any one of 3) to 6) described above, the ORC cycle (2) further includes a bypass line (27) configured to bypass the expansion turbine (24). The bypass line (27) has one end connected to the ORC cycle (2) on a downstream side of the vaporizer (23) and on an upstream side of the expansion turbine (24) on the ORC cycle (2) and the other end connected to a downstream side of the expansion turbine (24) and an upstream side of the condenser (21) on the ORC cycle (2). The one end (31B) of the gaseous fire extinguishing agent supply line (3B) is connected to the bypass line (27).

According to the configuration of 9) described above, the gaseous fire extinguishing agent flowing through the bypass line (27) is not expanded in the expansion turbine (24), and the pressure boosting action by the booster pump (22) remains. Thus, the pressure boosting action on the fire extinguishing agent by the booster pump (22) can be used to feed the gaseous fire extinguishing agent to the fire prevention area (10) through the bypass line (27) and the gaseous fire extinguishing agent supply line (3B).

10) In some embodiments, in the fire extinguishing equipment (1) according to any one of 3) to 6), and 9) described above, the gaseous fire extinguishing agent supply line (3B) includes an auxiliary compressor (36) that is provided on the gaseous fire extinguishing agent supply line (3B) and configured to pressurize the gaseous fire extinguishing agent flowing through the gaseous fire extinguishing agent supply line (3B).

According to the configuration of 10) described above, when the booster pump (22) alone cannot boost pressure sufficient for feeding the gaseous fire extinguishing agent to the fire prevention area (10) through the gaseous fire extinguishing agent supply line (3B), providing the auxiliary compressor (36) enables the pressure boosting sufficient for feeding the gaseous fire extinguishing agent to the fire prevention area (10). In addition, the configuration of 10) described above eliminates the need for sufficient pressure boosting with the booster pump (22) alone and thus allows increase in size and cost of the booster pump (22) to be suppressed.

11) In some embodiments, the fire extinguishing equipment (1) according to any one of 1) to 10) described above further includes an intermediate cycle (6) configured to circulate a third heat medium. The intermediate cycle (6) includes an intermediate cycle-side cooler (61) that is provided on the intermediate cycle (6) and configured to transfer cold energy from the first heat medium to the third heat medium; an intermediate cycle-side booster pump (62) that is provided on a downstream side of the intermediate cycle-side cooler (61) on the intermediate cycle (6) and configured to pressurize the third heat medium; and an intermediate cycle-side heater (63) that is provided on a downstream side of the intermediate cycle-side booster pump (62) and on an upstream side of the intermediate cycle-side cooler (61) on the intermediate cycle 6 and configured to transfer heat energy from a fourth heat medium to the third heat medium so as to increase the temperature of the third heat medium. The condenser (21) is provided on a downstream side of the intermediate cycle-side booster pump (62) and on an upstream side of the intermediate cycle-side heater (63) on the intermediate cycle (6) and configured to exchange heat between the gaseous fire extinguishing agent flowing through the ORC cycle (2) and the third heat medium flowing through the intermediate cycle (6).

According to the configuration of 11) described above, providing the intermediate cycle (6) facilitates the control of the temperature and the pressure of the fire extinguishing agent flowing through the ORC cycle (2), and thus the controllability of the ORC cycle (2) can be improved.

12) In some embodiments, in the fire extinguishing equipment (1) according to any one of 1) to 11) described above, the booster pump (22) is configured to control a pressure ratio.

According to the configuration of 12) described above, controlling the pressure ratio of the booster pump (22) allows the pressure of the liquid fire extinguishing agent discharged from the booster pump (22) to be controlled and a delivery distance of the fire extinguishing agent to be controlled. In this case, the delivery distance of the fire extinguishing agent can be increased compared to a conventional configuration in which nitrogen gas is delivered to a fire extinction target by an internal pressure of a cylinder. This improves the degree of freedom of the layout of the fire extinguishing equipment (1) in the structure (11).

13) In some embodiments, the fire extinguishing equipment (1) according to 12) described above further includes a fire alarm (7) provided at the at least one fire prevention area (10), and a flow control valve (34A/34B) provided on the at least one fire extinguishing agent supply line (3). The fire extinguishing equipment (1) is configured to open the flow control valve (34A/34B) and increase the pressure ratio of the booster pump (22) upon receipt of a fire alarm signal from the fire alarm 7.

According to the configuration of 13) described above, in ordinary times without the occurrence of a fire, increase in the power consumption of the ORC cycle (2) is suppressed by setting the pressure ratio of the booster pump (22) to be low, enabling the economical operation of the ORC cycle (2). In case of fire at the fire prevention area (10), a fire alarm signal transmitted by the fire alarm 7 is received, the flow control valve (34A/34B) is opened, and the pressure ratio of the booster pump (22) is increased, thus allowing the discharge pressure of the booster pump (22) to be increased to an appropriate pressure for delivering the fire extinguishing agent to the fire prevention area (10) and the fire extinguishing agent to be delivered to the fire prevention area (10) without excess or deficiency.

14) In some embodiments, in the fire extinguishing equipment (1) according to any one of 1) to 13) described above, each of the at least one fire prevention area (10) includes an interior space (100) into which the fire extinguishing agent is introduced. The ORC cycle (2) further includes a fire extinguishing agent storage tank (25) that is provided on a downstream side of the condenser (21) and on an upstream side of the booster pump (22) on the ORC cycle (2) and configured to store the liquid fire extinguishing agent obtained by liquefying the gaseous fire extinguishing agent in the condenser (21). The fire extinguishing equipment (1) further includes a first fire extinguishing equipment-side condenser (91) configured to transfer cold energy from a fifth heat medium to the fire extinguishing agent sprayed into the interior space (100) to liquefy the fire extinguishing agent and a liquid fire extinguishing agent recovery line (92) configured to guide the fire extinguishing agent liquefied in the first fire extinguishing equipment-side condenser (91) to the fire extinguishing agent storage tank (25).

According to the configuration of 14) described above, the fire extinguishing agent sprayed in the interior space (100) of the fire prevention area (10) can be liquefied and then returned to the fire extinguishing agent storage tank (25). In this case, recovering and reusing the fire extinguishing agent sprayed in the interior space (100) allows the consumption of the fire extinguishing agent that is expensive to be reduced, allowing the economic efficiency of the fire extinguishing equipment (1) to be improved.

15) In some embodiments, in the fire extinguishing equipment (1) according to any one of 1) to 13) described above, each of the at least one fire prevention area (10) includes an interior space (100) into which the fire extinguishing agent is introduced. The ORC cycle (2) further includes a fire extinguishing agent storage tank (25) that is provided on a downstream side of the condenser (21) and on an upstream side of the booster pump (22) on the ORC cycle (2) and configured to store the liquid fire extinguishing agent obtained by liquefying the gaseous fire extinguishing agent in the condenser (21). The fire extinguishing equipment (1) further includes a gaseous fire extinguishing agent recovery line (94) configured to extract gas containing the fire extinguishing agent sprayed in the interior space (100) from the interior space (100) and return the fire extinguishing agent liquefied to the fire extinguishing agent storage tank 25. The gaseous fire extinguishing agent recovery line (94) includes a second fire extinguishing equipment-side condenser (95) that is provided on the gaseous fire extinguishing agent recovery line (94) and configured to transfer cold energy from a sixth heat medium to the gas flowing through the gaseous fire extinguishing agent recovery line (94) to liquefy the fire extinguishing agent and a gas-liquid separator (96) that is provided on a downstream side of the second fire extinguishing equipment-side condenser (95) on the gaseous fire extinguishing agent recovery line (94) and configured to separate the fire extinguishing agent liquefied in the second fire extinguishing equipment-side condenser (95) from the gas.

The configuration of 15) described above can liquefy the fire extinguishing agent sprayed in the interior space (100) of the fire prevention area (10), separate the fire extinguishing agent from the air, and then return the fire extinguishing agent to the fire extinguishing agent storage tank (25). In this case, recovering the fire extinguishing agent from the air containing the sprayed fire extinguishing agent allows the consumption of the fire extinguishing agent that is expensive to be reduced, allowing the economic efficiency of the fire extinguishing equipment (1) to be improved.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. Fire extinguishing equipment, comprising:

an ORC cycle configured to circulate a fire extinguishing agent as a working medium; and at least one fire extinguishing agent supply line, the ORC cycle including:

a condenser provided on the ORC cycle and configured to transfer cold energy from a first heat medium to a gaseous fire extinguishing agent that is the fire extinguishing agent in a gas state to liquefy the gaseous fire extinguishing agent, a booster pump provided on a downstream side of the condenser on the ORC cycle and configured to pressurize a liquid fire extinguishing agent obtained by liquefying the gaseous fire extinguishing agent in the condenser, a vaporizer provided on a downstream side of the booster pump on the ORC cycle and configured to transfer heat energy from a second heat medium to the liquid fire extinguishing agent to vaporize the liquid fire extinguishing agent, and an expansion turbine provided on a downstream side of the vaporizer and on an upstream side of the condenser on the ORC cycle and configured to be driven by the gaseous fire extinguishing agent obtained by vaporizing the liquid fire extinguishing agent, the at least one fire extinguishing agent supply line being configured to extract at least one of the liquid fire extinguishing agent or the gaseous fire extinguishing agent from the ORC cycle and supply the at least one of the liquid fire extinguishing agent or the gaseous fire extinguishing agent to at least one fire prevention area, wherein the at least one fire extinguishing agent supply line includes a gaseous fire extinguishing agent supply line configured to feed the gaseous fire extinguishing agent from the ORC cycle to the at least one fire prevention area, and the gaseous fire extinguishing agent supply line has one end connected to a downstream side of the vaporizer and an upstream side of the condenser on the ORC cycle, and wherein the at least one fire extinguishing agent supply line further includes a diverging line having one end connected to the gaseous fire extinguishing agent supply line and including a fire extinguishing condenser that is provided on the diverging line and configured to liquefy the gaseous fire extinguishing agent, the other end of the gaseous fire extinguishing agent supply line is connected to a first fire prevention area of the at least one fire prevention area, and the other end of the diverging line is connected to a second fire prevention area being different from the first fire prevention area of the at least one fire prevention area.

2. The fire extinguishing equipment according to claim 1, wherein the ORC cycle further includes a bypass line configured to bypass the expansion turbine, the bypass line has one end connected to the downstream side of the vaporizer and an upstream side of the expansion turbine on the ORC cycle and the other end connected to a downstream side of the expansion turbine and an upstream side of the condenser on the ORC cycle, and the one end of the gaseous fire extinguishing agent supply line is connected to the bypass line.

3. The fire extinguishing equipment according to claim 1, wherein the gaseous fire extinguishing agent supply line includes an auxiliary compressor provided on the gaseous fire extinguishing agent supply line and configured to pressurize the gaseous fire extinguishing agent flowing through the gaseous fire extinguishing agent supply line.

4. The fire extinguishing equipment according to claim 1, further comprising an intermediate cycle configured to circulate a third heat medium, wherein the intermediate cycle includes an intermediate cycle-side cooler provided on the intermediate cycle and configured to transfer cold energy from the first heat medium to the third heat medium, an intermediate cycle-side booster pump provided on a downstream side of the intermediate cycle-side cooler on the intermediate cycle and configured to pressurize the third heat medium, and an intermediate cycle-side heater provided on a downstream side of the intermediate cycle-side booster pump and on an upstream side of the intermediate cycle-side cooler on the intermediate cycle and configured to transfer heat energy from a fourth heat medium to the third heat medium to increase a temperature of the third heat medium, and the condenser is provided on the downstream side of the intermediate cycle-side booster pump and on an upstream side of the intermediate cycle-side heater on the intermediate cycle and configured to exchange heat between the gaseous fire extinguishing agent flowing through the ORC cycle and the third heat medium flowing through the intermediate cycle.

5. The fire extinguishing equipment according to claim 1, wherein the booster pump is configured to control a pressure ratio.

6. The fire extinguishing equipment according to claim 5, further comprising:

a fire alarm provided at the at least one fire prevention area, and a flow control valve provided on the at least one fire extinguishing agent supply line, wherein the fire extinguishing equipment is configured to open the flow control valve and increase the pressure ratio of the booster pump upon receipt of a fire alarm signal from the fire alarm.

7. Fire extinguishing equipment, comprising:

an ORC cycle configured to circulate a fire extinguishing agent as a working medium; and at least one fire extinguishing agent supply line, the ORC cycle including:

a condenser provided on the ORC cycle and configured to transfer cold energy from a first heat medium to a gaseous fire extinguishing agent that is the fire extinguishing agent in a gas state to liquefy the gaseous fire extinguishing agent, a booster pump provided on a downstream side of the condenser on the ORC cycle and configured to pressurize a liquid fire extinguishing agent obtained by liquefying the gaseous fire extinguishing agent in the condenser, a vaporizer provided on a downstream side of the booster pump on the ORC cycle and configured to transfer heat energy from a second heat medium to the liquid fire extinguishing agent to vaporize the liquid fire extinguishing agent, and an expansion turbine provided on a downstream side of the vaporizer and on an upstream side of the condenser on the ORC cycle and configured to be driven by a gaseous fire extinguishing agent obtained by vaporizing the liquid fire extinguishing agent, the at least one fire extinguishing agent supply line being configured to extract at least one of the liquid fire extinguishing agent or the gaseous fire extinguishing agent from the ORC cycle and supply the at least one of the liquid fire extinguishing agent or the gaseous fire extinguishing agent to at least one fire prevention area, wherein each of the at least one fire prevention area includes an interior space into which the fire extinguishing agent is introduced, the ORC cycle further includes a fire extinguishing agent storage tank provided on a downstream side of the condenser and on an upstream side of the booster pump on the ORC cycle and configured to store the liquid fire extinguishing agent obtained by liquefying the gaseous fire extinguishing agent in the condenser, the fire extinguishing equipment further includes a first fire extinguishing equipment-side condenser configured to transfer cold energy from a fifth heat medium to the fire extinguishing agent sprayed in the interior space to liquefy the fire extinguishing agent, and a liquid fire extinguishing agent recovery line configured to guide the fire extinguishing agent liquefied in the first fire extinguishing equipment-side condenser to the fire extinguishing agent storage tank.

8. Fire extinguishing equipment, comprising:

an ORC cycle configured to circulate a fire extinguishing agent as a working medium; and at least one fire extinguishing agent supply line the ORC cycle including:

a condenser provided on the ORC cycle and configured to transfer cold energy from a first heat medium to a gaseous fire extinguishing agent that is the fire extinguishing agent in a gas state to liquefy the gaseous fire extinguishing agent, a booster pump provided on a downstream side of the condenser on the ORC cycle and configured to pressurize a liquid fire extinguishing agent obtained by liquefying the gaseous fire extinguishing agent in the condenser, a vaporizer provided on a downstream side of the booster pump on the ORC cycle and configured to transfer heat energy from a second heat medium to the liquid fire extinguishing agent to vaporize the liquid fire extinguishing agent, and an expansion turbine provided on a downstream side of the vaporizer and on an upstream side of the condenser on the ORC cycle and configured to be driven by a gaseous fire extinguishing agent obtained by vaporizing the liquid fire extinguishing agent, the at least one fire extinguishing agent supply line being configured to extract at least one of the liquid fire extinguishing agent or the gaseous fire extinguishing agent from the ORC cycle and supply the at least one of the liquid fire extinguishing agent or the gaseous fire extinguishing agent to at least one fire prevention area, wherein each of the at least one fire prevention area includes an interior space into which the fire extinguishing agent is introduced, the ORC cycle further includes a fire extinguishing agent storage tank provided on a downstream side of the condenser and on an upstream side of the booster pump on the ORC cycle and configured to store the liquid fire extinguishing agent obtained by liquefying the gaseous fire extinguishing agent in the condenser, the fire extinguishing equipment further includes a gaseous fire extinguishing agent recovery line configured to extract gas containing the fire extinguishing agent sprayed in the interior space from the interior space and return the fire extinguishing agent liquefied to the fire extinguishing agent storage tank, and the gaseous fire extinguishing agent recovery line includes a second fire extinguishing equipment-side condenser provided on the gaseous fire extinguishing agent recovery line and configured to transfer cold energy from a sixth heat medium to the gas flowing through the gaseous fire extinguishing agent recovery line to liquefy the fire extinguishing agent, and a gas-liquid separator provided on a downstream side of the second fire extinguishing equipment-side condenser on the gaseous fire extinguishing agent recovery line and configured to separate the fire extinguishing agent liquefied in the second fire extinguishing equipment-side condenser from the gas.

9. The fire extinguishing equipment according to claim 7, wherein the at least one fire extinguishing agent supply line includes a liquid fire extinguishing agent supply line configured to feed the liquid fire extinguishing agent from the ORC cycle to the at least one fire prevention area, and the liquid fire extinguishing agent supply line has one end connected to the downstream side of the condenser and an upstream side of the vaporizer on the ORC cycle.

10. The fire extinguishing equipment according to claim 8, wherein the at least one fire extinguishing agent supply line includes a liquid fire extinguishing agent supply line configured to feed the liquid fire extinguishing agent from the ORC cycle to the at least one fire prevention area, and the liquid fire extinguishing agent supply line has one end connected to the downstream side of the condenser and an upstream side of the vaporizer on the ORC cycle.

11. The fire extinguishing equipment according to claim 7 wherein the at least one fire extinguishing agent supply line includes a liquid fire extinguishing agent supply line configured to feed the liquid fire extinguishing agent from the ORC cycle to the at least one fire prevention area and having one end connected to the downstream side of the condenser and an upstream side of the vaporizer on the ORC cycle, and a gaseous fire extinguishing agent supply line configured to feed the gaseous fire extinguishing agent from the ORC cycle to the at least one fire prevention area and having one end connected to a downstream side of the vaporizer and an upstream side of the condenser on the ORC cycle.

12. The fire extinguishing equipment according to claim 8 wherein the at least one fire extinguishing agent supply line includes a liquid fire extinguishing agent supply line configured to feed the liquid fire extinguishing agent from the ORC cycle to the at least one fire prevention area and having one end connected to the downstream side of the condenser and an upstream side of the vaporizer on the ORC cycle, and a gaseous fire extinguishing agent supply line configured to feed the gaseous fire extinguishing agent from the ORC cycle to the at least one fire prevention area and having one end connected to a downstream side of the vaporizer and an upstream side of the condenser on the ORC cycle.

13. The fire extinguishing equipment according to claim 11, wherein the other end of the gaseous fire extinguishing agent supply line is connected to a first fire prevention area included in the at least one fire prevention area, and the other end of the liquid fire extinguishing agent supply line is connected to a second fire prevention area being different from the first fire prevention area of the at least one fire prevention area.

14. The fire extinguishing equipment according to claim 12, wherein the other end of the gaseous fire extinguishing agent supply line is connected to a first fire prevention area included in the at least one fire prevention area, and the other end of the liquid fire extinguishing agent supply line is connected to a second fire prevention area being different from the first fire prevention area of the at least one fire prevention area.

15. The fire extinguishing equipment according to claim 9, wherein the one end of the liquid fire extinguishing agent supply line is connected to a downstream side of the booster pump and an upstream side of the vaporizer on the ORC cycle.

16. The fire extinguishing equipment according to claim 10, wherein the one end of the liquid fire extinguishing agent supply line is connected to a downstream side of the booster pump and an upstream side of the vaporizer on the ORC cycle.

17. The fire extinguishing equipment according to claim 9, wherein the liquid fire extinguishing agent supply line includes an auxiliary pump provided on the liquid fire extinguishing agent supply line and configured to pressurize the liquid fire extinguishing agent flowing through the liquid fire extinguishing agent supply line.

18. The fire extinguishing equipment according to claim 10, wherein the liquid fire extinguishing agent supply line includes an auxiliary pump provided on the liquid fire extinguishing agent supply line and configured to pressurize the liquid fire extinguishing agent flowing through the liquid fire extinguishing agent supply line.

* * * * *